United States Patent
Ouyang

(10) Patent No.: US 11,107,188 B2
(45) Date of Patent: Aug. 31, 2021

(54) IMAGE PROCESSING METHOD AND DEVICE

(71) Applicant: BEIJING KEEYOO TECHNOLOGIES CO., LTD., Beijing (CN)

(72) Inventor: Congxing Ouyang, Beijing (CN)

(73) Assignee: BEIJING KEEYOO TECHNOLOGIES CO., LTD, Beijing (CN)

( * ) Notice: Subject to any disclaimer, the term of this patent is extended or adjusted under 35 U.S.C. 154(b) by 0 days.

(21) Appl. No.: 16/759,377

(22) PCT Filed: Oct. 17, 2018

(86) PCT No.: PCT/CN2018/110709
§ 371 (c)(1),
(2) Date: Apr. 27, 2020

(87) PCT Pub. No.: WO2019/085760
PCT Pub. Date: May 9, 2019

(65) Prior Publication Data
US 2020/0273148 A1   Aug. 27, 2020

(30) Foreign Application Priority Data
Nov. 1, 2017   (CN) .......................... 201711058265.7

(51) Int. Cl.
*G06T 3/40* (2006.01)
*G06T 7/564* (2017.01)

(52) U.S. Cl.
CPC ............ *G06T 3/4038* (2013.01); *G06T 7/564* (2017.01); *G06T 2207/30036* (2013.01)

(58) Field of Classification Search
None
See application file for complete search history.

(56) References Cited

U.S. PATENT DOCUMENTS 10,937,179 B2 *   3/2021   Ganapati ................. G06T 7/521
10,937,238 B2 *   3/2021   Ouyang ................. G06T 19/00
(Continued)

FOREIGN PATENT DOCUMENTS

CN         103356155 A         10/2013
CN         104885120 A         9/2015
(Continued)

OTHER PUBLICATIONS

"A Multi-Dimensional Microscopic Imaging System and Reconstruction Methods", by Yi Huang, Mei Zhou, Qingli Li, Hongying Liu, and Fangmin Guo, 2016 9th International Congress on Image and Signal Processing, BioMedical Engineering and Informatics (CISP-BMEI 2016), pp. 576-580, 2016. (Year: 2016).*
(Continued)

*Primary Examiner* — James A Thompson
(74) *Attorney, Agent, or Firm* — Daniel A. Thomson; Emerson, Thomson, Bennett, LLC

(57) ABSTRACT

The invention relates to the field of image processing, in particular, to an image processing method and device. The method comprises: obtaining image data and splicing to obtain a spliced image data block; matching an image data block containing the image data in the spliced image data block with images of blocks in a three-dimensional image frame database, updating a three-dimensional image model of a user and displaying according to a first preset displaying strategy if at least one mapping relation is obtained; displaying according to a second preset displaying strategy if the spliced image data block do not have mapping relation; if the preset conditions are met, the user's three-dimensional image model, the recorded number information of the blocks which have determined to obtain the mapping relationship and/or the image data blocks which have not obtained the mapping relationship are uploaded to the cloud server, so
(Continued)

that the cloud server updates the three-dimensional image Frame database, and the three-dimensional image can be obtained without continuously and orderly scanning the oral cavity, and the three-dimensional image frame database is continuously improved to improve the matching success rate.

20 Claims, 6 Drawing Sheets

(56) References Cited

U.S. PATENT DOCUMENTS

| | | | |
|---|---|---|---|
| 10,943,342 B2* | 3/2021 | Wang | A61B 1/041 |
| 2008/0273773 A1 | 11/2008 | Moshe et al. | |
| 2014/0160112 A1* | 6/2014 | Yaron | G06Q 30/0643 |
| | | | 345/419 |
| 2015/0221116 A1* | 8/2015 | Wu | A61B 1/00009 |
| | | | 382/128 |
| 2015/0334276 A1 | 11/2015 | Ecker et al. | |
| 2016/0015246 A1* | 1/2016 | Clausen | A61B 1/0005 |
| | | | 433/29 |
| 2017/0213354 A1 | 7/2017 | Glinec | |
| 2018/0168781 A1* | 6/2018 | Kopelman | G06T 17/00 |
| 2019/0287229 A1* | 9/2019 | Wang | G06T 7/337 |
| 2019/0347814 A1* | 11/2019 | Ganapati | A61B 1/00011 |
| 2020/0170760 A1* | 6/2020 | Dawood | G06K 9/00214 |

FOREIGN PATENT DOCUMENTS

| | | |
|---|---|---|
| CN | 105303615 A | 2/2016 |
| CN | 105912874 A | 8/2016 |
| CN | 106663327 A | 5/2017 |
| CN | 107295227 A | 10/2017 |
| KR | 1020110100340 A | 9/2011 |
| WO | 2014100950 A1 | 7/2014 |

OTHER PUBLICATIONS

First Office Action of Chinese counterpart application (Appl. No. 201711058265.7), dated May 20, 2019.
International search report with written opinion of corresponding PCT application, dated Jan. 8, 2019.
English translation of First Office Action of Chinese counterpart application (Appl. No. 201711058265.7), dated May 20, 2019.
English translation of Written Opinion of corresponding PCT application, dated Jan. 8, 2019.
English translation of CN103356155A.
Abstract of CN104885120A.
English translation of CN105303615A.
English translation of CN105912874A.
Abstract of CN106663327A.
English translation of CN107295227.
English translation of KR1020110100340A.

\* cited by examiner

IMAGE PROCESSING METHOD AND DEVICE

This application claims the priority of a Chinese patent application filed with the China patent office on Nov. 1, 2017 with application number 201711058265.7 and the invention title "an image processing method and device", the entire contents of which are hereby incorporated by reference.

TECHNICAL FIELD

The invention relates to the technical field of image processing, in particular, to an image processing method and device.

BACKGROUND ART

The traditional oral endoscope is a kind of equipment used for dental optical impression-taking. When in use, the optical gun head used for impression-taking needs to be moved orderly in the upper dentition and lower dentition of a user. However, the scanning gun head is not supported to roam freely in the oral cavity, and is highly professional, has poor user interaction effect, and requires professionals to be operated.

At present, there is also a user self-service oral endoscope, which the user holds, puts a camera part into the oral cavity, and rotates the camera part to perform endoscopy on the oral cavity. However, endoscopic images can only show a very small part at a time. Although the images of teeth can also be seen, it is difficult to confirm which tooth this is and which specific location of the oral cavity the currently seen details are in. In addition, there is a lack of three-dimensional image information, which makes it impossible to match the full dentition impression-taking, to generate the current digital full dentition impression in real time, and thus to support dental applications such as three-dimensional printing of the dental shell-type dentifrice.

SUMMARY OF INVENTION

Embodiments of the present invention provides an image processing method and an image processing device, which are used for solving the problems of poor user interaction effect and difficulty in supporting self-service three-dimensional true color modeling of users in oral cavity image presentation in the prior art.

The specific technical solution provided by the embodiments of the invention is as follows:

an image processing method, including:

Step A, obtaining image data of a user acquired by an endoscope, wherein the image data at least comprises image data captured by an imaging unit in the endoscope;

Step B, splicing the image data, and/or the image data and stored image data blocks to obtain a spliced image data block, wherein the image data block includes at least one image data;

Step C, respectively matching the image data blocks containing the image data in the spliced image data block with the images of the blocks in the stored three-dimensional image frame database, wherein the three-dimensional image frame database stores image data of blocks dividing the three-dimensional image frame image of and location information of images of each block;

Step D: determining the location of the block corresponding to the at least one image data block containing the image data in the stored three-dimensional image contour of the user according to the mapping relationship, if it is determined to obtain a mapping relationship between at least one image data block containing the image data and a block in the three-dimensional image frame database, and reconstructing the at least one image data block containing the image data on the corresponding determined location in the three-dimensional image contour of the user to obtain reconstructed three-dimensional image data, updating the currently restored three-dimensional image model of the user according to the reconstructed three-dimensional image data, and displaying all or part of the updated three-dimensional image model of the user and the spliced image data block other than the other image data blocks determined to obtain the mapping relationship according to a first preset display policy, wherein the initial value of the three-dimensional image model of the user is the three-dimensional image contour of the user;

Step E: uploading the updated three-dimensional image model of the user and the recorded number information of the blocks determined to obtain the mapping relationship to a cloud server, and uploading part or all of the spliced image data block except the image data blocks which have determined to obtain the mapping relation with the blocks in the three-dimensional image frame database are uploaded to the cloud server according to a preset rule, if it is determined that the preset condition is satisfied, so that the cloud server updates the stored three-dimensional image frame database according to the updated three-dimensional image model of the user and the number information of the blocks which have determined to obtain the mapping relation and part or all of the spliced image data block except the image data blocks which have determined to obtain the mapping relation with the blocks in the three-dimensional image frame database.

Preferably, the location information of the image of the block includes: the spatial location relationship between each block;

the image of each block in the three-dimensional image contour is a three-dimensional curved surface shape based on the image of the block in the three-dimensional image frame database or the three-dimensional image model of the user, and comprises a preset image with a single color and a single texture.

Preferably, before the step of matching the image data blocks containing the image data in the spliced image data block with the images of the blocks in the stored three-dimensional image frame database, respectively, the method further includes:

determining the endoscope to have been placed in the oral cavity, according to the spliced image data block and a preset image pattern recognition algorithm.

Preferably, according to a first preset display strategy, all or part of the updated three-dimensional image model of the user and other image data blocks in the spliced image data block except those that have determined to obtain a mapping relationship are displayed, specifically including:

sorting the spliced image data block except other image data blocks which have determined to obtain mapping relation from large to small according to the area of the image data blocks or the number of image data included in the image data blocks;

determining the number d of display areas in the current display interface and the number n of other image data blocks in the spliced image data block except those which have determined to obtain a mapping relationship, and judging the values of n and d−1;

extracting the first d–1 image data blocks from the sorted image data blocks, if n is not less than d–1, and sequentially displaying the updated three-dimensional image model of the user and the extracted first d–1 image data blocks in the d display areas, respectively;

adjusting the number of display areas in the current display interface so that the number of display areas is the same as n+1, if n is less than d–1, and sequentially displaying the updated three-dimensional image model of the user and the sorted image data blocks in the display areas in the adjusted current display interface, respectively.

Preferably, the method further includes:

recording the number information of the block determined to obtain the mapping relationship according to the mapping relationship if it is determined to obtain a mapping relationship between at least one image data block containing the image data and a block in the three-dimensional image frame database.

Preferably, if it is determined that the mapping relationship between the image data block containing the image data and the block in the three-dimensional image frame database is not obtained, and at least one of the spliced image data block has obtained the mapping relationship with the block in the three-dimensional image frame database, Step D further includes:

displaying all or part of the currently stored three-dimensional image model of the user and other image data blocks in the spliced image data block except those which have determined to obtain a mapping relationship according to a first preset display strategy.

Preferably, according to a first preset display strategy, all or part of the currently stored three-dimensional image model of the user and other image data blocks in the spliced image data block except those that have determined to obtain a mapping relationship are displayed, specifically including:

sorting the spliced image data block except other image data blocks which have determined to obtain mapping relation from large to small according to the area of the image data blocks or the number of image data included in the image data blocks;

determining the number d of display areas in the current display interface and the number n of other image data blocks in the spliced image data block except those which have determined to obtain a mapping relationship, and judging the values of n and d–1;

extracting the first d–1 image data blocks from the sorted image data blocks, if n is not less than d–1, and sequentially displaying the currently stored three-dimensional image model of the user and the extracted first d–1 image data blocks in the d display areas, respectively;

adjusting the number of display areas in the current display interface so that the number of display areas is the same as n+1, if n is less than d–1, and sequentially displaying the currently stored three-dimensional image model of the user and the sorted image data blocks in the display areas in the adjusted current display interface, respectively.

Preferably, if it is determined that the mapping relationship between the image data block containing the image data and the block in the three-dimensional image frame database is not obtained, and the image data block with the mapping relationship with the block in the three-dimensional image frame database is not obtained in the spliced image data block, Step D further includes:

displaying all or part of the spliced image data block according to a second preset display strategy.

Preferably, according to a second preset display strategy, all or part of the spliced image data block is displayed, specifically comprising:

sorting the spliced image data block from large to small according to the area of the image data blocks or the number of the image data blocks containing the image data if the number of the spliced image data block is a;

determining the number d of display areas in the current display interface and judging the values of a and d, extracting the first d image data blocks from the sorted an image data blocks, if a is not less than d, and sequentially displaying the extracted first d image data blocks in the d display areas, respectively, adjusting the number of display areas in the current display interface so that the number of display areas is the same as a, if a is less than d, and sequentially displaying the a image data blocks in the display areas in the adjusted current display interface, respectively.

Preferably, before the step of splicing the image data, and/or the image data and stored image data blocks, the method further includes:

determining that the number of the image data is larger than a preset threshold value.

Preferably, the method further includes:

After Step D is executed, the process returns to Step A.

an image processing method, including:

Step A, obtaining image data of a user acquired by an endoscope, wherein the image data at least comprises image data captured by an imaging unit in the endoscope;

Step B splicing the image data, and the image data and stored image data blocks to obtain a spliced image data block, wherein the image data block includes at least one image data;

Step C, respectively matching the image data blocks containing the image data in the spliced image data block with the images of the blocks in the stored three-dimensional image frame database, wherein the three-dimensional image frame database stores image data of blocks dividing the three-dimensional image frame image of and location information of images of each block;

Step D: if it is determined that the mapping relationship between the image data block containing the image data and the blocks in the three-dimensional image frame database is not obtained, and the image data block with the mapping relationship with the blocks in the three-dimensional image frame database is not obtained in the spliced image data block, displaying all or part of the spliced image data block according to a second preset display strategy;

Step E: uploading part or all of the spliced image data block to the cloud server according to the preset rules if it is determined that the preset conditions are satisfied, so that the cloud server updates the stored three-dimensional image frame database according to part or all of the spliced image data block.

Preferably, according to a second preset display strategy, all or part of the spliced image data block is displayed, specifically comprising:

sorting the spliced image data block from large to small according to the area of the image data blocks or the number of the image data blocks containing the image data if the number of the spliced image data block is a;

determining the number d of display areas in the current display interface and judging the values of a and d, extracting the first d image data blocks from the sorted an image data blocks, if a is not less than d, and sequentially displaying the extracted first d image data blocks in the d display areas, respectively, adjusting the number of display areas in the current display interface so that the number of display areas is the same as a, if a is less than d, and sequentially displaying the a image data blocks in the display areas in the adjusted current display interface, respectively;

the method further includes: After Step D is executed, the process returns to Step A.

Preferably, before the step of splicing the image data, and/or the image data and stored image data blocks, the method further includes:

determining that the number of the image data is larger than a preset threshold value.

An image processing device, including:

a receiving unit, configured to obtain image data of a user acquired by the endoscope, wherein the image data at least comprises image data captured by an imaging unit in the endoscope;

a processing unit configured to: splice the image data and the image data and the stored image data block to obtain a spliced image data block, wherein the image data block includes at least one image data; match the image data blocks containing the image data in the spliced image data block with the images of the blocks in the stored three-dimensional image frame database, respectively, and determine the location of the block corresponding to the at least one image data block containing the image data in the stored three-dimensional image contour of the user according to the mapping relationship, if it is determined to obtain a mapping relationship between at least one image data block containing the image data and a block in the three-dimensional image frame database, and reconstructing the at least one image data block containing the image data on the corresponding determined location in the three-dimensional image contour of the user to obtain reconstructed three-dimensional image data, and update the currently stored three-dimensional image model of the user according to the reconstructed three-dimensional image data, wherein the three-dimensional image frame database stores image data of blocks dividing the three-dimensional image frame image of and location information of images of each block; the initial value of the three-dimensional image model of the user is the three-dimensional image contour of the user;

a presentation unit, configured to present all or part of the updated three-dimensional image model of the user and the merged image data block except other image data blocks determined to obtain the mapping relationship according to a first preset presentation policy;

a transmission unit, configured to update the updated three-dimensional image model of the user and the recorded number information of the blocks determined to obtain the mapping relationship to a cloud server, and upload part or all of the spliced image data block except the image data blocks which have determined to obtain the mapping relation with the blocks in the three-dimensional image frame database are uploaded to the cloud server according to a preset rule, if it is determined that the preset condition is satisfied, so that the cloud server updates the stored three-dimensional image frame database according to the updated three-dimensional image model of the user and the number information of the blocks which have determined to obtain the mapping relation and part or all of the spliced image data block except the image data blocks which have determined to obtain the mapping relation with the blocks in the three-dimensional image frame database.

Preferably, the location information of the image of the block includes: the spatial location relationship between each block;

the image of each block in the three-dimensional image contour is a three-dimensional curved surface shape based on the image of the block in the three-dimensional image frame database or the three-dimensional image model of the user, and comprises a preset image with a single color and a single texture.

Preferably, before the step of matching the image data blocks containing the image data in the spliced image data block with the images of the blocks in the stored three-dimensional image frame database, respectively, the processing unit is further configured to:

determine the endoscope to have been placed in the oral cavity according to the spliced image data block and the preset image pattern recognition algorithm.

Preferably, according to a first preset display strategy, all or part of the updated three-dimensional image model of the user and other image data blocks in the spliced image data block except those that have determined to obtain a mapping relationship are displayed. The display unit is specifically configured to:

sort the spliced image data block except other image data blocks which have determined to obtain mapping relation from large to small according to the area of the image data blocks or the number of image data included in the image data blocks;

determine the number d of display areas in the current display interface and the number n of other image data blocks in the spliced image data block except those which have determined to obtain a mapping relationship, and judge the values of n and d−1;

extract the first d−1 image data blocks from the sorted image data blocks, if n is not less than d−1, and sequentially display the updated three-dimensional image model of the user and the extracted first d−1 image data blocks in the d display areas, respectively;

adjust the number of display areas in the current display interface so that the number of display areas is the same as n+1, if n is less than d−1, and sequentially display the updated three-dimensional image model of the user and the sorted image data blocks in the display areas in the adjusted current display interface, respectively.

Preferably, the processing unit is further configured to:

record the number information of the block determined to obtain the mapping relationship according to the mapping relationship if it is determined to obtain a mapping relationship between at least one image data block containing the image data and a block in the three-dimensional image frame database.

Preferably, the processing unit is further configured to, if it is determined that the mapping relationship between the image data block containing the image data and the block in the three-dimensional image frame database is not obtained, and at least one of the spliced image data block has obtained the mapping relationship with the block in the three-dimensional image frame database, the display unit is further configured to:

display all or part of the currently stored three-dimensional image model of the user and other image data blocks in the spliced image data block except those which have determined to obtain a mapping relationship according to a first preset display strategy.

Preferably, according to a first preset display strategy, all or part of the currently stored three-dimensional image model of the user and other image data blocks in the spliced image data block except those that have determined to obtain a mapping relationship are displayed. The display unit is specifically configured to:

sort the spliced image data block except other image data blocks which have determined to obtain mapping relation from large to small according to the area of the image data blocks or the number of image data included in the image data blocks;

determine the number d of display areas in the current display interface and the number n of other image data blocks in the spliced image data block except those which have determined to obtain a mapping relationship, and judge the values of and d−1;

extract the first d−1 image data blocks from the sorted image data blocks, if a is not less than d−1, and sequentially display the currently stored three-dimensional image model of the user and the extracted first d−1 image data blocks in the d display areas, respectively;

adjust the number of display areas in the current display interface so that the number of display areas is the same as n+1, if n is less than d−1, and sequentially display the currently stored three-dimensional image model of the user and the sorted image data blocks in the display areas in the adjusted current display interface, respectively.

Preferably, the processing unit is further configured to, if it is determined that the mapping relationship between the image data block containing the image data and the block in the three-dimensional image frame database is not obtained, and the image data block with the mapping relationship with the block in the three-dimensional image frame database is not obtained in the spliced image data block, the display unit is further configured to:

display all or part of the spliced image data block according to a second preset display strategy.

Preferably, all or part of the spliced image data block is displayed according to a second preset display strategy, and the display unit is specifically configured to:

sort the spliced image data block from large to small according to the area of the image data blocks or the number of the image data blocks containing the image data if the number of the spliced image data block is a;

determine the number d of display areas in the current display interface and judge the values of a and d, extract the first d image data blocks from the sorted a image data blocks, if a is not less than d, and sequentially display the extracted first d image data blocks in the d display areas, respectively, adjust the number of display areas in the current display interface so that the number of display areas is the same as a, if a is less than d, and sequentially display the a image data blocks in the display areas in the adjusted current display interface, respectively.

Preferably, before splicing the image data, and the image data and the stored image data blocks, the processing unit is further configured to:

determine that the number of the image data is larger than a preset threshold value.

Preferably, receiving unit is further configured to, after the display unit displays all or part of the updated three-dimensional image model of the user and other image data blocks in the spliced image data block except those that have determined to obtain the mapping relationship according to a first preset display strategy, return to perform acquisition of the image data of the user acquired by the endoscope.

An image processing device, including:

a receiving unit, configured to obtain image data of a user acquired by the endoscope, wherein the image data at least comprises image data captured by an imaging unit in the endoscope;

a processing unit, configured to: splice the image data and the image data and the stored image data block to obtain a spliced image data block, wherein the image data block includes at least one image data; match the image data blocks containing the image data in the spliced image data block with the images of the blocks in the stored three-dimensional image frame database, respectively; wherein the three-dimensional image frame database stores image data of blocks dividing the three-dimensional image frame image of and location information of images of each block;

a display unit, configured to display all or part of the spliced image data block according to a second preset display strategy if the processing unit determines that the mapping relationship between the image data block containing the image data and the block in the three-dimensional image frame database is not obtained, and the spliced image data block does not obtain the image data block with the mapping relationship with the block in the three-dimensional image frame database;

a transmission unit, configured to upload part or all of the spliced image data block to the cloud server according to the preset rules if it is determined that the preset conditions are satisfied, so that the cloud server updates the stored three-dimensional image frame database according to part or all of the spliced image data block.

Preferably, all or part of the spliced image data block is displayed according to a second preset display strategy, and the display unit is specifically configured to:

sort the spliced image data block from large to small according to the area of the image data blocks or the number of the imago data blocks containing the image data if the number of the spliced image data block is a;

determine the number d of display areas in the current display interface and judge the values of a and d, extract the first d image data blocks from the sorted a image data blocks, if a is not less than d, and sequentially display the extracted first d image data blocks in the d display areas, respectively, adjust the number of display areas in the current display interface so that the number of display areas is the same as a, if a is less than d, and sequentially display the a image data blocks in the display areas in the adjusted current display interface, respectively;

the receiving unit is further configured to return to perform acquisition of image data of a user acquired by an endoscope after the display unit displays all or part of the spliced image data block according to a second preset display strategy;

preferably, before splicing the image data, and the image data and the stored image data blocks, the processing unit is further configured to:

determine that the number of the image data is larger than a preset threshold value.

In the embodiment of the invention, obtaining image data of a user acquired by an endoscope; wherein the image data includes at least the image data captured by an imaging unit in the endoscope, and the type of the image data is a depth image; the acquired image data of the user indicates that splicing processing is not performed; splicing the image data, and the image data and stored image data blocks to obtain a spliced image data block, wherein the image data block includes at least one image data; respectively matching the image data blocks containing the image data in the spliced image data block with the images of blocks in the stored three-dimensional image frame database; wherein the three-dimensional image frame database stores image data of blocks dividing the three-dimensional image frame image of and location information of images of each block; the image data of the block includes number information and image feature information. According to different matching results, corresponding different display methods and different information uploaded to the cloud server are executed to enable the cloud server to update the three-dimensional image frame database. In this way, the obtained image data of the user are spliced to obtain a spliced image data block, and the spliced image data block are matched according to the established three-dimensional image frame database. If at least one of the image data blocks is matched successfully, reconstruction is performed according to the three-dimensional image contour of the user, the currently stored three-dimensional image model of the user is updated, and then the three-dimensional image model of the user and the image data blocks without mapping relation are displayed. If no matching is successful, the spliced image data block is displayed without the need for the endscope to scan the oral cavity continuously and orderly. The user can scan the oral cavity at will by using the endoscope, so long as image data of all parts of the internal surface of the oral cavity are obtained regardless of whether the images are orderly or not, and whether the images are matched successfully or not, three-dimensional images of the oral cavity can be displayed without professional operation, user self-service oral cavity endoscopy is well supported. It can not only present a three-dimensional image of a user's oral cavity, but also perform dynamic display, so that the display effect is better, the use experience and the interaction effect of the user are improved, and the self-service three-dimensional true color drawing mode of the user can be well supported.

In addition, different information may be transmitted to the cloud server according to different matching results, but the cloud server can update the three-dimensional image frame database according to the information, thus solving the problem that the three-dimensional image processing of the oral cavity can conditionally perform block matching and display. The three-dimensional image frame database can be continuously updated so as to gradually enrich and perfect the three-dimensional image frame database. The process is more complete and closer to actual engineering implementation. Furthermore, with continuous use and update, the matching success rate can be improved when the three-dimensional image frame database is used later, so that more and more three-dimensional true color images are contained in the three-dimensional image model of the user, and the display effect is improved.

DESCRIPTION OF EMBODIMENTS

Hereinafter, the technical scheme in the embodiment of the present invention will be clearly and completer described in conjunction with the drawings in the embodiment of the present invention, and it will be apparent that the described embodiment is only a part of the embodiment of the present invention, and not all of the embodiments. Based on the embodiments of the present invention, all other embodiments obtained by those skilled in the art without creative labor are within the scope of the present invention.

It should be noted that the embodiments of the present invention are mainly directed to oral three-dimensional images, wherein the endoscope may be an oral endoscope, and of course, the embodiments of the present invention are not limited to oral three-dimensional images, but can also be applied to three-dimensional images in other fields, and only the oral cavity will be described below as an example.

Embodiment 1

Figure 1:
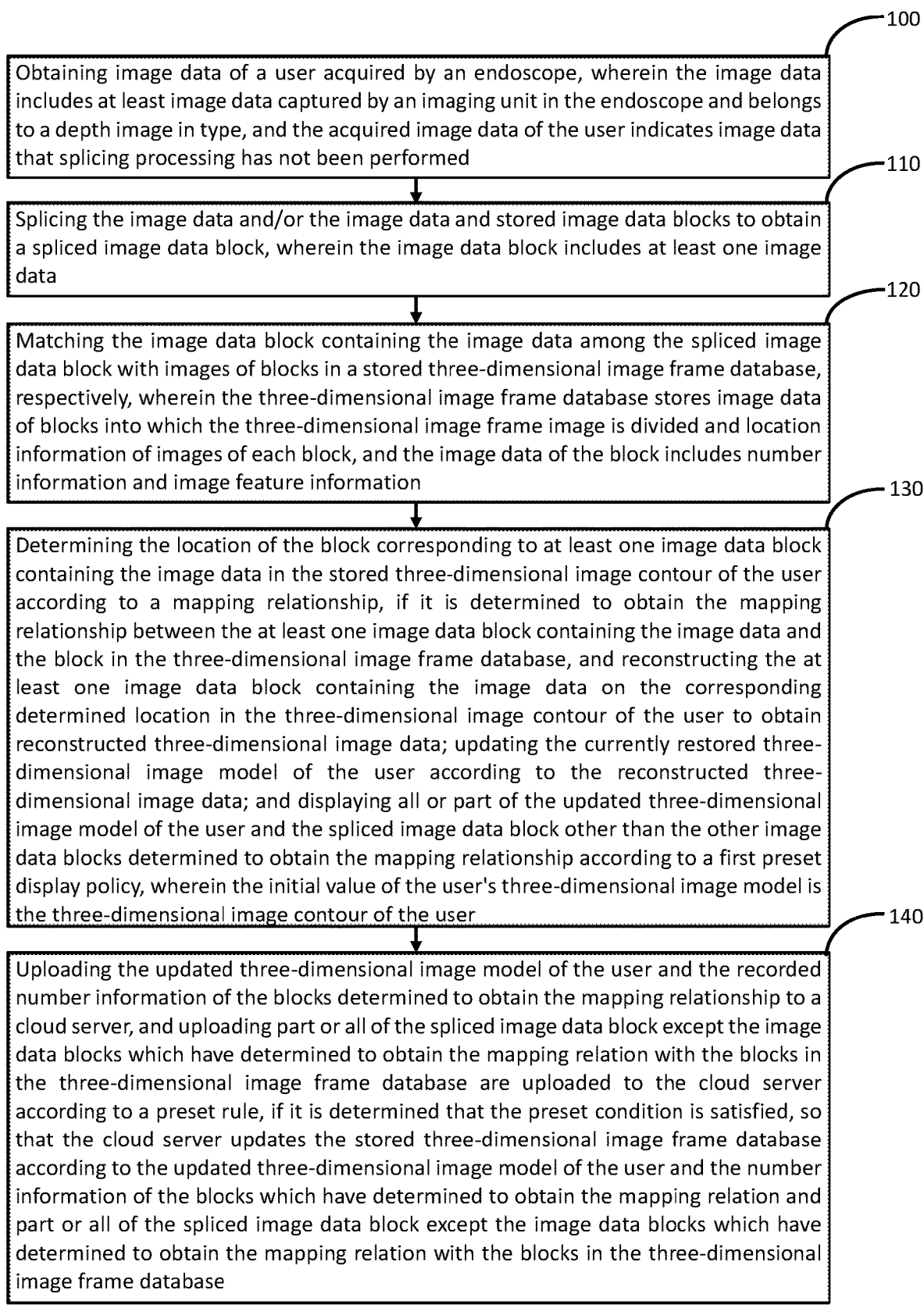
FIG. 1 is a flowchart of an image processing method according to Embodiment 1 of the present invention.

Referring to FIG. 1. In Embodiment 1 of the present invention, the specific flow of the image processing method is as follows:

Step 100: obtaining image data of a user acquired by an endoscope. Wherein the image data includes at least image data captured by an imaging unit in the endoscope and belongs to a depth image in type, and the acquired image data of the user indicates image data that splicing processing has not been performed.

Wherein, the endoscope is, for example, an oral endoscope, which is provided with an imaging unit for taking images. The endoscope can be provided with one imaging unit or a plurality of imaging units, and the captured image data belongs to a depth image in type, that is, an RGBD image, which is a three-dimensional true color image. In this way, the three-dimensional information of the image can be acquired for subsequent three-dimensional image processing.

Preferably, the oral endoscope in an embodiment of the invention can be provided with two imaging units back to back on the endoscope head, and the relative locations of the two imaging units are fixed and calibrated in advance, synchronously illuminated and synchronously photographed. In this way, the image data synchronously captured by the two imaging units respectively carries corresponding imaging unit identifiers, such as the number information of the imaging units, and have the same timing stamp information. Wherein, the time sequence stamp information indicates the number of times the image data has been acquired since the endoscope is turned on. In this way, the timing stamp can be set for each image data acquired, which is also convenient to distinguish the image data acquired at different times.

In this way, the image data acquired in step 100 is a plurality of image data without splicing processing with imaging unit identifiers and timing stamp information.

These image data may have the same timing stamp or may have different timing stamps, depending on the number of imaging units in the endoscope, that is, the number of image data acquired by the endoscope each time, and the number of image data set for processing each time.

Further, before performing Step 110, it further includes determining that the number of image data is greater than a preset threshold.

For example, if the endoscope acquires 2 image data each time and the preset threshold value is 6, i.e. the number of image data to be processed each time is 6, the endoscope needs to acquire the image data of the user captured 3 times before performing the subsequent splicing process. For example, the six image data are image data P(1), P(2), P(3), P(4), P(5), P(6). Wherein, P(1) and P(2) are two pieces of image data with the same time sequence stamp (r=1) and imaging unit numbers of 1 and 2, respectively; P(3) and P(4) are two pieces of image data with the same time sequence stamp (r=2) and imaging unit number of 1 and 2, respectively; and P(5) and P(6) are two pieces of image data with the same time sequence stamp (r=3) and imaging unit numbers of 1 and 2, respectively.

In other words, in the embodiment of the present invention, in order to improve the processing efficiency, it is not necessary to carry out subsequent processing every time the image data acquired by the endoscope is received, because the image data acquired by the endoscope at one time may be relatively small. In addition, an image data acquired by an endoscope is usually a curved surface with a small area, therefore, processing can be performed after reaching a certain number, and the accuracy and efficiency of subsequent processing such as splicing and matching can be improved.

Step 110: splicing the image data and/or the usage data and stored image data blocks to obtain a spliced image data block, wherein the image data block includes at least one image data.

In the embodiment of the invention, the image data and the image data and the stored image data blocks are respectively judged and spliced to obtain a spliced image data block. The spliced image data block is stored, and the stored image data blocks are updated according to the spliced image data block. In other words, in an embodiment of the invention, the spliced image data block represents all spliced image data that can be spliced or cannot be spliced. Wherein, it includes not only larger area image data that can be spliced and spliced successfully and is formed after being spliced with other image data, but also image data that is still isolated after being judged to be spliced unsuccessfully. Including not only an image data block containing the image data acquired in step 100, that is, the image data to be processed this time, but also an image data block that does not include the image data acquired in step 100. The image data is transformed into an image data block after splicing processing. The spliced image data block may include one image data, representing a single image data that cannot be spliced, or may include a plurality of image data, representing that the plurality of image data can be spliced and spliced to obtain a larger image data.

For example, when the nth image data P(N) is received, the spliced image data block obtained after splicing processing can be T+M mutually independent (i.e. mutually incapable of splicing) image data blocks, namely Q°(1) . . . Q°(t) . . . Q°(T), and Q(1), Q(m) . . . Q(M), wherein the image data block Q°(t) is formed by splicing n°(t) image data. The image data block Q(m) is formed by splicing n(m) image data, and [n°(1)+ . . . +n°(T)]+[n(1)+n(2)+ . . . n(M)]=N, where n(t)≥1 and n(m)≥1.

Furthermore. In the embodiment of the present invention, the number of image data included in the spliced image data block can also be recorded, so as to facilitate the subsequent sorting of image data blocks.

In this way. In the example of the present invention, the acquired image data is spliced first, and then the subsequent matching is performed, and the area of the spliced image data block is relatively large, so that the matching efficiency can be improved, the number of images can be reduced, the matching times of images and blocks can be reduced, the time is reduced, and the execution efficiency is also improved.

Step 120: matching the image data block containing the image data among the spliced image data block with images of blocks in a stored three-dimensional image frame database, respectively. Wherein the three-dimensional image frame database stores image data of blocks into which the three-dimensional image frame image is divided and location information of images of each block. The image data of the block includes number information and image feature information.

In an embodiment of the invention, a three-dimensional image frame database and a three-dimensional image contour of the oral cavity are established in advance.

1) In the embodiment of the present invention, the three-dimensional image frame database is constructed based on various conditions of a human oral cavity. The three-dimensional image frame database stores general frame data of a three-dimensional image model of the human oral cavity, and the frame data covers image feature information of all surface areas of the human oral cavity under various conditions, such as information of shape features, color features, texture features and the like.

The three-dimensional image frame database stores image data of blocks into which the three-dimensional image frame image is divided and location information of images of each block. The image location information of the block includes: spatial location relation between each block. The image data of the block includes number information and image feature information.

2) In the embodiment of the present invention, the three-dimensional image contour stores shape contour data of the three-dimensional image of each region (including each block) on the inner surface of the whole human oral cavity. Wherein the three-dimensional image contour of the user at least stores shape contour data of the three-dimensional image of each block in the oral cavity of the user. In addition, in an embodiment of the invention, when in actual use, the three-dimensional image contour of each user can be updated according to the actual situation of the user, and with the use of different users, there will be a three-dimensional image contour belonging to the oral cavity of each user.

The image of each block in the contour of the three-dimensional image is a three-dimensional curved surface shape based on the image of the block in the three-dimensional image frame database or the three-dimensional image model of the user, and includes a preset image with a single color and a single texture.

When Step 120 is executed, it specifically includes: The image data blocks containing the image data in the spliced image data block can be respectively matched with the images of the blocks in the stored three-dimensional image frame database according to the image feature information of the blocks, the spatial location relation and/or the number information between the blocks, or the relative spatial location relation of the spliced image data block determined according to the identifiers of the imaging units carried by the image data in the image data blocks.

In an embodiment of the invention, only the image data block containing the image data in Step 100 in the spliced image data block is matched with the image of the blocks in the three-dimensional image frame database this time. The image data in step 100 is the image data to be processed this time. This is because, before the splicing process is performed this time, the currently stored image data blocks must have been subjected to matching processing, and in the embodiment of the present invention, if the successfully matched image data blocks are reconstructed in the three-dimensional image contour of the user, the currently stored image data blocks are all unsuccessfully matched. If all the spliced image data block are matched after the splicing process is performed this time, the matching must not be successful for those image data blocks which cannot be spliced with the new image data and are still stored before, matching again will only increase the matching times and reduce the processing efficiency, therefore. In an embodiment of the invention, the matching is not needed again for this part of image data blocks, time is stored, and the efficiency is improved.

For example, if the user's image data acquired by the endoscope are P(1) and P(2) and the stored image data blocks are {Q'(1) ... Q'(m) ... Q'(32), M=32}, then the image data P(1) and P(2), and P(1), P(2) and Q'(1) ... Q'(32) can be spliced. If the image data P(1) and the first image data block Q'(1) stored in the system can be spliced and can be spliced with the fourth image data block Q'(4) stored in the system, and the image data P(2) cannot be spliced with any other image data block, the image data P(1), the image data block Q'(1) and the image data block Q'(4) are spliced to form a new image data block, which is denoted as Q'(Temp 1). If the image data P(2) cannot be spliced with any other image data block, the image data P(1), the image data block Q'(1) and the image data block Q'(4) are spliced to form a new image data block, which is denoted as Q'(Temp 1). The image data P(2) also constitutes an independent new image data block, denoted as Q'(Temp 2), then only Q'(Temp 1) and Q'(Temp 2) are matched with the images of the blocks in the three-dimensional image frame database during watching.

Further, before performing Step 120, it further includes: determining the endoscope to have been placed in the oral cavity, according to the spliced image data block and a preset image pattern recognition algorithm.

According to the method, whether the endoscope has been placed in the oral cavity is judged through image pattern recognition, whether oral cavity endoscope is turned on or not does not need to be started manually by a user through a switch, the switch does not need to be arranged on the endoscope during implementation, the hardware setting is reduced, and the use experience of the user is improved at the same time.

Of course, other methods can also be used to judge whether the endoscope has been placed in the oral cavity. For example, a switch is set on the endoscope and controlled manually by the user. If the user manually closes the switch after placing the endoscope in the oral cavity, the system considers that the endoscope has been placed in the oral cavity.

In this way, in the embodiment of the present invention, the three-dimensional image processing is mainly aimed at the oral cavity. Therefore, according to the image pattern recognition algorithm, if it is determined that the image data block is not an oral cavity image, the subsequent matching process can be avoided, and invalid operations can be avoided. If it is determined that the image data block is an oral cavity image, it can be determined that the endoscope has been placed in the oral cavity, and the subsequent matching operation can be continued.

Step 130: determining the location of the block corresponding to at least one image data block containing the image data in the stored three-dimensional image contour of the user according to a mapping relationship, if it is determined to obtain the mapping relationship between the at least one image data block containing the image data and the block in the three-dimensional image frame database, and reconstructing the at least ore image data block containing the image data on the corresponding determined location in the three-dimensional image contour of the user to obtain reconstructed three-dimensional image data; updating the currently restored three-dimensional image model of the user according to the reconstructed three-dimensional image data; and displaying all or part of the updated three-dimensional image model of the user and the spliced image data block other than the other image data blocks determined to obtain the mapping relationship according to a first preset display policy. The initial value of the user's three-dimensional image model is the three-dimensional image contour of the user.

When step 130 is executed, it specifically includes:

First, determining the location of the block corresponding to at least one image data block containing the image data in the stored three-dimensional image contour of the user according to a mapping relationship, if it is determined to obtain the mapping relationship between the at least one image data block containing the image data and the block in the three-dimensional image frame database, and reconstructing the at least one image data block containing the image data on the corresponding determined location in the three-dimensional image contour of the user to obtain reconstructed three-dimensional image data; updating the currently restored three-dimensional image model of the user according to the reconstructed three-dimensional image data.

The initial value of the user's three-dimensional image model is the three-dimensional image contour of the user.

The method specifically includes the following steps of:
1) determining the location of the block corresponding to at least one image data block containing the image data in the stored three-dimensional image contour of the user.

Specifically, it is determined that the at least one image data block containing the image data corresponds to a block in the three-dimensional image frame database of the user at least according to image feature information of the block in the three-dimensional image frame database; and determining that the at least one image data block containing the image data corresponds to the location in the three-dimensional image contour of the user according to the fact that the at least one image data block containing the image data corresponds to the block in the three-dimensional image frame database of the user.

Of course, the location in the three-dimensional image contour of the user can also be determined in combination with the spatial location relationship and/or number information of the blocks, the spatial location relationship of the image data blocks, and the like, which is not limited in the embodiment of the present invention.

2) reconstructing the at least one image data block containing the image data at a corresponding determined location in the three-dimensional image contour of the user to obtain reconstructed three-dimensional image data.

Specifically, according to boundary feature information of blocks in a three-dimensional image frame database, a three-dimensional curved surface image belonging to a corresponding block is extracted from the at least one image data block containing the image data. Wherein the image feature information at least includes boundary feature information of the block. The extracted three-dimensional curved surface image is replaced by the image at the corresponding determined location in the three-dimensional image contour of the user to obtain the reconstructed three-dimensional image data.

3) updating the currently stored three-dimensional image model of the user according to the reconstructed three-dimensional image data.

Specifically, the reconstructed three-dimensional image data is replaced by the image at the corresponding determined location in the currently stored three-dimensional image model of the user.

In this way, each time the reconstructed three-dimensional image data is obtained, the images at the corresponding locations in the three-dimensional image model of the user can be continuously replaced to realize the effect of dynamically updating the three-dimensional image model of the user.

Further, the three-dimensional image contour of the user can also be updated, specifically:

acquiring the three-dimensional image contour corresponding to the updated three-dimensional image model of the user according to the updated three-dimensional image model of the user, and updating the stored three-dimensional image contour of the user according to the three-dimensional image contour corresponding to the updated three-dimensional image model of the user.

In this way, for different users, there will be corresponding oral cavity three-dimensional image contours of the users. When scanning the oral cavity later, the actual oral cavity image information of the users can be more easily seen. Moreover, the three-dimensional image model of the user and the three-dimensional image contours of the user can be continuously updated, and the matching efficiency and accuracy can also be improved.

It should be noted that. In the embodiment of the present invention, the three-dimensional image frame database initially established may not be comprehensive enough to contain oral cavity images in all cases, thus when matching image data blocks with images of blocks in the three-dimensional image frame database, unsuccessful matching may occur. Therefore. In the embodiment of the invention, the problem of establishing a three-dimensional image frame database in practice is mainly solved, the problem of conditional execution of block matching and display during oral three-dimensional image processing is solved, the problem of how to continuously update and perfect the three-dimensional image frame database and the problem of how to display and process when matching is successful and unsuccessful are solved, thus the three-dimensional image frame database can be gradually enriched and perfected, the flow is more complete, and the method is closer to actual engineering realization.

In this way, when step 130 is executed, if it is determined to obtain the mapping relationship between at least one image data block containing the image data and a block in the three-dimensional image frame database, the three-dimensional image model of the user can be updated to realize the display of the subsequent three-dimensional image model.

Further, it further includes:

If it is determined to obtain a mapping relationship between at least one image data block containing the image data and a block in the three-dimensional image frame database, the number information of the block determined to obtain the mapping relationship is recorded according to the mapping relationship.

In the embodiment of the present invention, the number information of the blocks determined to obtain the mapping relationship is recorded for updating the three-dimensional image frame database later, and the number or location of the blocks in the three-dimensional image frame database, or the image data of the blocks, the image feature information of the blocks, as well as information such as operation at the block level such as adding one or a group of blocks, and the like can be updated.

Then, displaying all or part of the updated three-dimensional image model of the user and the spliced image data block other than the other image data blocks determined to obtain the mapping relationship according to a first preset display policy.

The method specifically includes the following steps of:

1) sorting the spliced image data block other than other image data blocks which have determined to obtain mapping relation from large to small according to the area of the image data blocks or the number of image data included in the image data blocks.

In the embodiment of the invention, the image data block is composed of one or more image data. Therefore, the larger the number of image data blocks including image data, the larger the area of the image data blocks. Of course, the area of image data blocks including a smaller number of image data blocks may be larger instead, which has no influence on subsequent sorting and display. In embodiment of the present invention, the sorting may be performed according to the number of included image data or the sorting may be performed according to the area thereof, which is not limited, and the sorting may be performed in an alternative manner.

Wherein, in the embodiment of the present invention, the acquired image data is a depth image which carries the imaging unit identifier, so the area of the obtained image data block can be calculated according to the internal calibration parameters of the imaging unit and the depth image data, and the method for specifically calculating the area of the image data block can be based on the method in the prior art. In the embodiment of the present invention, there is no limitation, and it will not be described in detail here.

For example, there are m spliced image data block. Wherein, the number of other image data blocks in the spliced image data block except those which have been determined to obtain the mapping relationship is n, and the number of other image data blocks in the spliced image data block except those which have been determined to obtain the mapping relationship is $Q'(1) \ldots Q'(n)$ after sorting from large to small according to the number of image data included.

In the embodiment of the invention, the sorting is performed to preferentially display image data blocks with larger area or more image data. This is because the larger area or more image data are included, the more image information is reflected, which is convenient for users to view and understand the displayed images.

(2) determining the number d of display areas in the current display interface and the number n of other data blocks in the spliced image data block except those which have determined to obtain a mapping relationship, and judging the values of n and d−1.

The relationship between n and d−1 is judged here because at this time there are already image data blocks and blocks that have been successfully matched, and the user's three-dimensional image model can be updated. During the display, a region needs to be reserved to display the user's three-dimensional image model. Therefore, there are d−1 display areas for image data blocks that have not been successfully matched.

3) if n is not less than d−1, taking out the first d−1 image data blocks from the sorted image data blocks, and sequentially displaying the updated three-dimensional image model of the user and the taken out first d−1 image data blocks in the d display areas, respectively.

Figure 2:
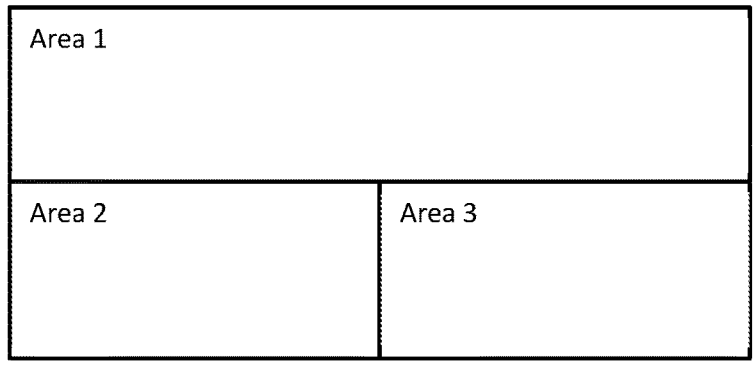
FIG. 2 is a schematic diagram of division of display areas in a current interface according to Embodiment 1 of the present invention.

For example, if n is 5, d is 3, and it decides that 5>(3−1), then the first two, namely Q'(1) and Q'(2), need to be taken out of the sorted Q'(1) . . . Q'(n). During the display, referring to FIG. 2, the display area in the current interface is divided into area 1, area 2 and area 3. In the first display area, that is, the updated three-dimensional image model of the user is displayed in area 1, Q'(1) is displayed in the second display area, area 2, and Q'(2) is displayed in the third display area, area 3.

4) if n is less than d−1, adjusting the number of display areas in the current display interface so that the number of display areas is the same as n+1, and sequentially displaying the updated three-dimensional image model of the user and the sorted image data blocks in the display areas in the adjusted current display interface, respectively.

For example, n is 2, d is 4, and it decides that 2<(4−1), which indicates that the number of current display areas is relatively large and there will be no blank areas for displaying images. In order to further improve the user's viewing experience and display effect, it is necessary to reduce the number of display areas, d is reduced to 3, and the current display interface is changed to 3 display areas. Then during the display, the updated three-dimensional image model of the user is displayed in the first display area, Q'(1) is displayed in the second display area, and Q'(2) is displayed in the third display area.

In the embodiment of the present invention, when step 130 is executed. In addition to the above-mentioned case where it is determined to obtain the mapping relationship between at least one image data block containing the image data and a block in the three-dimensional image frame database, the following cases are also included:

In the first case, if it is determined that the mapping relationship between the image data block containing the image data and the block in the three-dimensional image frame database is not obtained, and at least one image data block in the spliced image data block has obtained the mapping relationship with the block in the three-dimensional image frame database, then all or part of the currently stored three-dimensional image model of the user and other image data blocks in the spliced image data block except those determined to obtain the mapping relationship are displayed according to a first preset display strategy.

In the embodiment of the invention, the image data acquired by the oral cavity endoscope can be continuously acquired since the oral cavity endoscope is turned on and the endoscopic operation is started using the oral cavity endoscope. Every time the number of image data reaches a preset threshold, a splicing and matching operation is started until the endoscopic operation is finished. The first case here is that the image data block containing the image data processed this time has not obtained the mapping relation with the block in the three-dimensional image frame database after the splicing and matching processing is performed this time. However, since the oral endoscope is tarred on and the endoscopic operation is started using the oral endoscope, the mapping relationship with the blocks in the three-dimensional image frame database has been obtained in a certain process before the splicing and matching process. At this time, although the user's three-dimensional image model will not be updated this time, there are still stored user's three-dimensional image models, and the currently stored user's three-dimensional image model and the spliced image data block still need to be displayed dining the display.

The method specifically includes the following steps of:
1) sorting the spliced image data block except other image data blocks which have determined to obtain mapping relation from large to small according to the area of the image data blocks or the number of image data included in the image data blocks.

(2) determining the number d of display areas in the current display interface and the number n of other image data blocks in the spliced image data block except those which have determined to obtain a mapping relationship, and judging the values of n and d−1.

3) if n is not less than d−1, taking out the first d−1 image data blocks from the sorted image data blocks, and respectively displaying the currently stored three-dimensional image model of the user and the taken out first d−1 image data blocks in the d display areas in sequence;

4) if n is less than d−1, adjusting the number of display areas in the current display interface so that the number of display areas is the sane as n+1, and sequentially displaying the currently stored three-dimensional image model of the user and the sorted image data blocks in the display areas in the adjusted current display interface, respectively.

The first preset display strategy in the first case here is the same as the first preset display strategy in step 130, except that the contents displayed are different. Therefore, it will not be described in detail here.

In the second case, if it is determined that the mapping relationship between the image data block containing the image data and the block in the three-dimensional image frame database is not obtained, and the image data block with the mapping relationship with the block in the three-dimensional image frame database is not obtained in the spliced image data block, then all or part of the spliced image data block is displayed according to a second preset display strategy.

The second case here is the case where the mapping relation with the blocks in the three-dimensional image frame database has not been obtained since the oral endoscope is turned on and the endoscopic operation is started using the oral endoscope.

In the embodiment of the invention, the spliced image data block is a plurality of mutually independent image data blocks. This is because, in the embodiment of the present invention, the endscope is provided with two or more imaging units to synchronously collect images, so the image processing method in the embodiment of the present invention supports the user to self-service complete oral endoscopic operation without the need for orderly and continuous scanning by the user.

The method specifically includes the following steps of:
1) sorting the spliced image data block from large to small according to the area of the image data blocks or the number of the image data blocks containing the image data if the number of the spliced image data block is a.

2) determining the number d of display areas in the current display interface and judging the values of a and d, if a is not less than d, the first d image data blocks are extracted from the sorted a image data blocks, and the extracted first d image data blocks are sequentially displayed in the d display areas, respectively. If a is less than d, the number of display areas in the current display interface is adjusted so that the number of display areas is the same as a, and the a image data blocks are sequentially displayed in the display areas in the adjusted current display interface, respectively.

For example, after sorting the spliced image data block from large to small, they are Q'(1) . . . Q'(a). If a is 6, d is 4, and it decides that 6>4, then the first four image data blocks are taken out from Q'(1) . . . Q'(a), respectively, that is Q'(1), (2), Q'(3), and Q'(4). During the display, Q'(1) is displayed in the first display area, Q'(2) is displayed in the second display area, Q'(3) is displayed in the third display area, and Q'(4) is displayed in the fourth display area.

For another example, if a is 3, d is 4, and it decides that 3<4, the number of display areas needs to be reduced, and d is reduced to 3, when there are three display areas in the current display interface, Q'(1) is displayed in the first display area, Q'(2) is displayed in the second display area, and Q'(3) is displayed in the third display area.

Further, when the image data of the user acquired by the endoscope is acquired again, after step 130 is executed, the above-mentioned step 100 is returned.

In this way. In the embodiment of the present invention, image data acquired by the endoscope will be continuously acquired since the endoscope is turned on and the endoscopic operation is started using the endoscope, and the currently displayed image data block and/or the user's three-dimensional image model are updated through continuous splicing and matching, so that the display effect is improved, the user can see the user's time-dimensional image model, and the user can see the displayed spliced image data block for unsuccessfully matched image data blocks.

Step 140: uploading the updated three-dimensional image model of the user and the recorded number information of the blocks determined to obtain the mapping relationship to a cloud server, and uploading part or all of the spliced image data block except the image data blocks which have determined to obtain the mapping relation with the blocks in the three-dimensional image frame database are uploaded to the cloud server according to a preset rule, if it is determined that the preset condition is satisfied, so that the cloud server updates the stored three-dimensional image frame database according to the updated three-dimensional image model of the user and the number information of the blocks which have determined to obtain the mapping relation and part or all of the spliced image data block except the image data blocks which have determined to obtain the mapping relation with the blocks in the three-dimensional image frame database.

Wherein, the preset conditions can be the following: it is determined that the endoscope is turned off, or the area of the reconstructed area in the user's three-dimensional image model is larger than a preset threshold, or the area of the spliced image data block reaches a preset threshold, etc. In the embodiment of the present invention, there is no limitation, thus. In the embodiment of the present invention, the uploading is not performed every time the user's three-dimensional image model is updated and the new number information of the block determined to obtain the mapping relationship is obtained, but is performed uniformly when certain conditions are met, which not only can reduce the uploading times, reduce the server pressure, but also can improve the efficiency of the cloud server in updating the three-dimensional image frame database.

Wherein, the number information of the blocks determined to obtain the mapping relationship uploaded to the cloud server includes not only the number information of the blocks obtained the mapping relationship recorded after the splicing and matching processing, but also the number information of all the blocks determined to obtain the mapping relationship recorded after each splicing and matching processing starting from the endoscopic operation.

The above preset rules are, for example, that the number of spliced image data block including image data is not less than the preset number, for example, 5, or that the area of spliced image data block is not less than the preset area, for example, 100 mm$^2$, which is not limited in the embodiment of the present invention and can be set according to actual conditions.

In other words, in the example of the present invention, the information uploaded to the cloud server may include the following parts: 1) a user's three-dimensional image model; 2) number information of recorded blocks that have been determined to obtain a mapping relationship with the spliced image data block; 3) some or all of the spliced image data block except the image data blocks which have determined to obtain the mapping relation with the blocks in the three-dimensional image frame database. In this way, the cloud server can continuously update the three-dimensional image frame database according to the information, specifically update the number information of the blocks therein, adding blocks, adding general frame data of the three-dimensional image model of human oral cavity under different conditions, etc., gradually update and perfect the three-dimensional image frame database to form a powerful and complete three-dimensional image frame database of oral cavity with a complete label system, thus improving the success rate of matching using the three-dimensional image frame database afterwards.

It is worth noting that in the embodiment of the present invention, the information uploaded to the cloud server at different stages in the actual implementation process may be different, for example, the actual implementation process may be divided into three stages:

Stage 1: in the initial stage, because the three-dimensional image frame database is still imperfect, it is possible that the spliced image data block cannot be successfully matched with the images of the blocks in the three-dimensional image frame database, and the blocks with mapping relation with the spliced image data block cannot be obtained. Therefore, it may not be possible to obtain the above-mentioned first part and second part information, i.e., 1) a user's three-dimensional image model and 2) the number information of the recorded blocks that have been determined to obtain a mapping relationship with the spliced image data block. At this time, the information uploaded to the cloud server may be only the third part of the above information, i.e., 3) some or all of the image data blocks in the spliced image data block other than the image data blocks that have determined to obtain the mapping relationship with the blocks in the stored three-dimensional image frame database, and then the cloud server can only update the three-dimensional image frame database according to some or all of the image data blocks in the spliced image data block other than the image data blocks that have determined to obtain the mapping relationship with the blocks in the stored three-dimensional image frame database.

Stage 2: as the three-dimensional image frame database is continuously used and updated, the matching success rate will be improved. At least one image data block can be successfully matched with the image of the block in the three-dimensional image frame database, and then the user's three-dimensional image module will be updated, and the number information of the block that has been determined to obtain the mapping relationship with the spliced image data block can be obtained. Of course, there is also a possibility that the image data block cannot be successfully matched at this time. Therefore, the information uploaded to the cloud server will include: 1) a User's three-dimensional image model; 2) number information of recorded blocks that have been determined to obtain a mapping relationship with the spliced image data block; 3) some or all of the spliced image data block except the image data blocks which have determined to obtain the mapping relation with the blocks in the three-dimensional image frame database, and then the cloud server can update the three-dimensional image frame database according to the three parts of information.

Stage 3: with the image processing method of the embodiment of the present invention operating for a long time, the mature stage can be reached. At this time, the three-dimensional image frame database is relatively perfect, which can include images of all oral conditions, and the label system of the three-dimensional image frame database is also perfect. The tag system at least includes the number information, relative location information, image information, etc. of the blocks. Therefore, when matching, the success rate will be greatly improved, and there may be no unsuccessful matching. Therefore, at this time, it may not be possible to obtain 3) some or all of the spliced image data block except the image data blocks that have determined to obtain the mapping relationship with the blocks in the stored three-dimensional image frame database, and the information uploaded to the cloud server is only 1) a user's three-dimensional image model and 2) the recorded number information of the blocks that have determined to obtain the mapping relationship with the spliced image data block, and then the cloud server updates the three-dimensional image frame database according to the user's three-dimensional image model and the recorded number information of the blocks that have determined to obtain the mapping relationship with the spliced image data block.

In the embodiment of the invention, aiming at the image data of the user acquired by the acquired endoscope and splicing the image data with the stored image data block, the spliced image data block is obtained, then the spliced image data block is matched with the images of blocks in the stored three-dimensional image frame database, and the three-dimensional image model of the user and the spliced image data block are displayed according to different matching results and corresponding different display strategies. Finally, if it is determined that the preset condition is satisfied, the user's three-dimensional image model, the recorded number information of the blocks that have been determined to obtain the mapping relationship with the spliced image data block, and some or all of the spliced image data block except the image data blocks which have determined the mapping relation with the blocks in the three-dimensional image frame database are uploaded to the cloud server, so that the cloud server can continuously update the three-dimensional image frame database, the problem of conditional block matching and display during the three-dimensional image processing of the oral cavity is solved, the three-dimensional image frame database can be continuously updated and improved, and effectively displaying and processing when the matching is successful or unsuccessful, thereby gradually enriching and improving the three-dimensional image frame database and improving the matching success rate. With the continuous improvement of the three-dimensional image frame database, when matching is performed in the later stage, the matching can be basically successful, the successfully matched image data blocks can be continuously reconstructed on the corresponding determined locations in the three-dimensional image contour of the user, and the three-dimensional image model of the user can be updated. In this way, the displayed user's three-dimensional image model will contain more and more three-dimensional true color images. If there is no unsuccessfully matched image data block, only the user's three-dimensional image model will be displayed during the display, and the display effect of the user's three-dimensional image model is better, so that the user can more intuitively view the specific part of the oral cavity image. In the embodiment of the invention, not only can a three-dimensional image of a user's oral cavity be obtained, so that the user can view specific parts of the oral cavity. In addition, since a plurality of mutually independent image data blocks can be obtained, each image data block can be used as an initial area, so that a plurality of initial areas can be provided, a user can scan any location in the oral cavity at will, continuous scanning can be performed from the plurality of initial areas, scanning can be performed from other locations to form a new initial area, continuous scanning from a unique initial area in the oral cavity is not required, the use of the user is convenient, and the use experience of the user is improved. Furthermore, the scanned three-dimensional images of the oral cavity are dynamically displayed, so that the presentation effect is better and more convenient and flexible.

Embodiment 2

Figure 3:
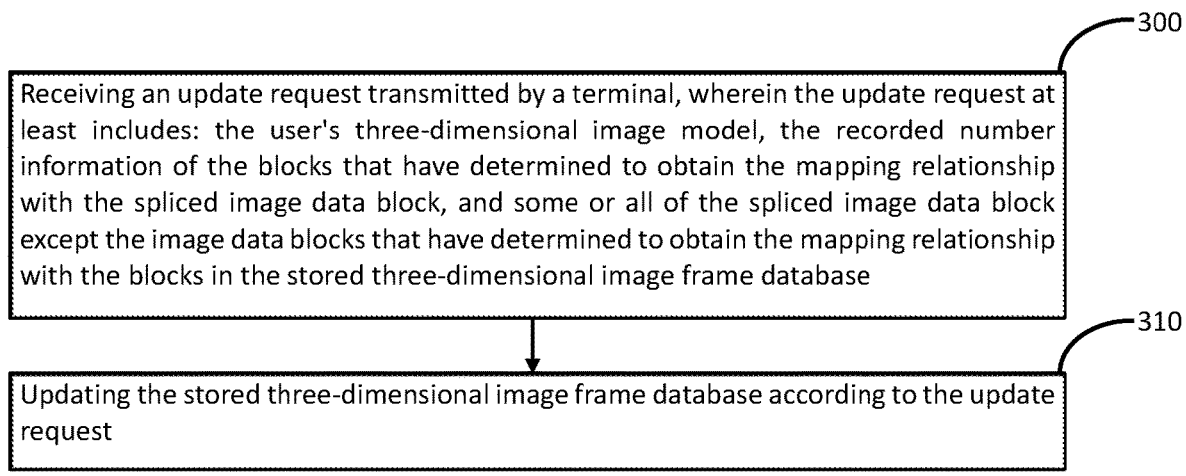
FIG. 3 is a flowchart of a method for updating a cloud server according to Embodiment 2 of the present invention.

Based on the above embodiment, referring to FIG. 3. In Embodiment 2 of the present invention, the specific flow of the updating method of the cloud server is as follows:

Step 300: receiving an update request transmitted by a terminal. The update request at least includes: the user's three-dimensional image model, the recorded number information of the blocks that have determined to obtain the mapping relationship with the spliced image data block, and some or all of the spliced image data block except the image data blocks that have determined to obtain the mapping relationship with the blocks in the stored three-dimensional image frame database.

Wherein the three-dimensional image frame database stores image data of blocks dividing the three-dimensional image frame image and location information of images of each block. The image data of the block includes number information and image feature information. The spliced image data block is obtained after the terminal performs splicing processing according to the image data of the user acquired by the endoscope.

In the embodiment of the present invention. In the actual implementation process, the update request may contain different information, which is specifically described in Embodiment 1 above and will not be repeated here.

Step 310: updating the stored three-dimensional image frame database according to the update request.

In the second embodiment of the present invention, the cloud server receives three types of information, namely, the user's three-dimensional image model, the number information of the block, and the image data block without a mapping relationship, when the spliced image data block and the block of the three-dimensional image frame database are matched successfully or not matched successfully.

In the embodiment of the invention, when updating the three-dimensional image frame database, it specifically includes:

1) in the user's three-dimensional image model, other three-dimensional true color curved surface image parts other than each block that has determined the mapping relationship with the spliced image data block are images that exceed the known block labels in the existing three-dimensional image frame database (existing label system).

For this part of the three-dimensional true color curved surface image. In the endoscopic process, the processing method of the embodiment of the invention fills the gap between each block which has determined the mapping relation with the spliced image data block by performing traditional image splicing, thereby meeting the requirements of oral endoscopic and three-dimensional modeling of users. However, in the embodiment of the present invention, it is still necessary to transmit the user's three-dimensional image model and the recorded number information of the blocks that have been determined to obtain the mapping relationship with the spliced image data block to the cloud server.

After receiving it, the cloud server needs to detect the following situation: there are other three-dimensional true color curved surface image parts that have not been identified among the blocks in the user's three-dimensional image model that have been determined to obtain the mapping relationship. Then, the cloud server will distribute the user's three-dimensional image model with other three-dimensional true color curved surface image parts that have not yet been identified to the corresponding dental experts, so that the corresponding dental experts can conduct research and analysis on the other three-dimensional true color curved surface image parts that have not yet been identified, and update the label system, thereby updating the latest three-dimensional image frame database (oral endoscopic panoramic label system).

2) for some or all of the spliced image data block except the image data blocks that have determined the mapping relationship with the blocks in the stored three-dimensional image frame database, the cloud server can also distribute the image data blocks to corresponding dental experts according to a preset strategy, so that the corresponding dental experts can conduct research and analysis on the image data blocks and update the tag system, thereby updating the latest three-dimensional image frame database (oral endoscopic panoramic tag system).

In this way, in an embodiment of the invention, the cloud server can continuously update the three-dimensional image frame database, which solves the problem that the three-dimensional image processing of the oral cavity can conditionally perform block watching and displaying, can continuously update and perfect the three-dimensional image frame database, and can effectively display and process when the matching is successful or unsuccessful, thereby gradually enriching and perfecting the three-dimensional image frame database. Furthermore, with continuous use and improvement, the success rate of matching can be improved when the three-dimensional image frame database is used later, so that more and more three-dimensional true color images are contained in the three-dimensional image model of the user, and the display effect is improved.

Embodiment 3

Figure 4:
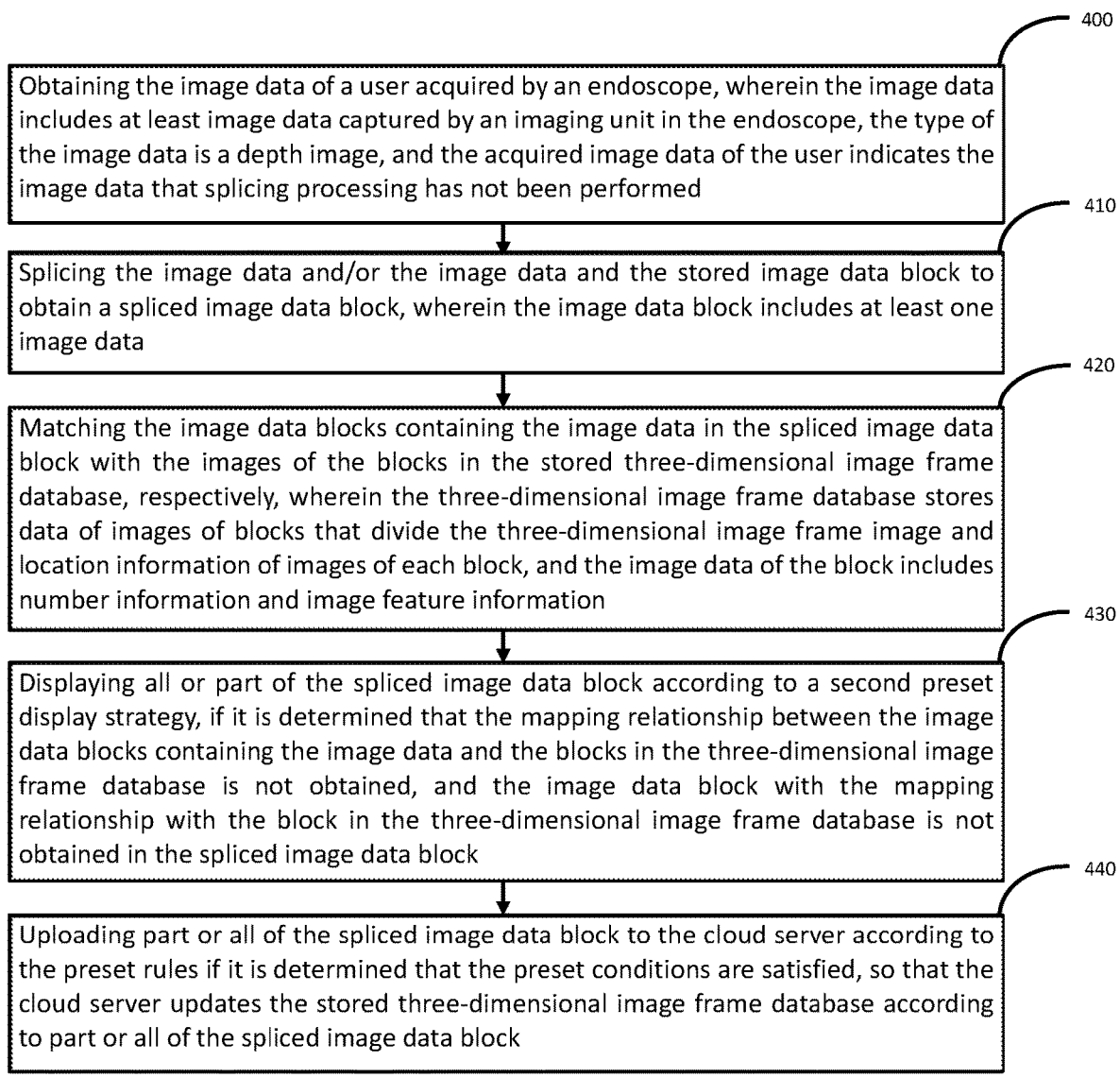
FIG. 4 is a flowchart of an image processing method according to Embodiment 3 of the present invention.

Based on the above embodiment, referring to FIG. 4. In embodiment 3 of the present invention, the specific flow of the image processing method is as follows:

Step 400: obtaining the image data of a user acquired by an endoscope, wherein the image data includes at least image data captured by an imaging unit in the endoscope, and the type of the image data is a depth image. The acquired image data of the user indicates the image data that splicing processing has not been performed.

Step 410: splicing the image data and/or the image data and the stored image data block to obtain a spliced image data block, wherein the image data block includes at least one image data.

Further, before performing step 410, it further includes determining that the number of the image data is greater than a preset threshold.

In this way, after the accumulated image data reaches a certain number, the splicing and subsequent processing can be started, which can improve the processing efficiency.

Step 420: matching the image data blocks containing the image data in the spliced image data block with the images of the blocks in the stored three-dimensional image frame database, respectively. Wherein the three-dimensional image frame database stores data of images of blocks that divide the three-dimensional image frame image and location information of images of each block. The image data of the block includes number information and image feature information.

Further, before performing step 420, the it further includes:

According to the spliced image data block and the preset image pattern recognition algorithm, the endoscope is determined to have been placed in the oral cavity.

In this way, according to the image pattern recognition, whether it has been placed in the oral cavity can be automatically recognized according to the oral cavity endoscopic situation, and subsequent operations can be performed after the oral cavity is confirmed, thus avoiding invalid operations, saving processing resources and improving efficiency.

Step 430: displaying all or part of the spliced image data block according to a second preset display strategy, if it is determined that the mapping relationship between the image data blocks containing the image data and the blocks in the three-dimensional image frame database is not obtained, and the image data block with the mapping relationship with the block in the three-dimensional image frame database is not obtained in the spliced image data block.

In other words, after matching, not only the image data blocks containing the image data processed this time do not have a mapping relationship, but also the spliced image data block does not have a mapping relationship since the endoscope is turned on to start endoscopic operation, thus the three-dimensional image model of the user cannot be reconstructed and updated. In this case, in the embodiment of the present invention, the three-dimensional image can still be displayed by splicing the obtained image data to obtain a plurality of mutually independent image data blocks, and the three-dimensional image data blocks are displayed to meet the requirement of viewing the three-dimensional image of the oral cavity of a user.

wherein, the step of displaying all or part of the spliced image data block according to a second preset display strategy includes:

1) sorting the spliced image data block from large to small according to the area of the image data blocks or the number of the image data blocks containing the image data if the number of the spliced image data block is a;

2) determining the number d of display areas in the current display interface and judging the values of a and d. If a is not less than d, the first d image data blocks are extracted from the sorted a image data blocks, and the extracted first d image data blocks are sequentially displayed in the d display areas, respectively. If a is less than d, the number of display areas in the current display interface is adjusted so that the number of display areas is the same as a, and the a image data blocks are sequentially displayed in the display areas in the adjusted current display interface, respectively.

Step 440: uploading part or all of the spliced image data block to the cloud server according to the preset rules if it is determined that the preset conditions are satisfied, so that the cloud server updates the stored three-dimensional image frame database according to part or all of the spliced image data block.

In other words, in Embodiment 3 of the present invention, it is mainly aimed at the situation that the endscope has not obtained the image data block of the mapping relation with the blocks in the three-dimensional image frame database since the endoscopic operation is started this time. At this time, the three-dimensional image displayed to the user is the spliced image data block, and only the image data block is uploaded to the cloud server. In this way, although the mapping relation is not obtained and cannot be reconstructed on the three-dimensional image contour of the user, the spliced image data block can still be displayed. In addition, since the image data block is a plurality of independent three-dimensional images, each image data block can be used as an initial area, so there can be a plurality of initial areas, users can scan any location in the oral cavity at will, continuous scanning can be performed from the plurality of initial areas, and scanning can also be performed from other locations to form a new initial area, continuous scanning from a unique initial area in the oral cavity is not required, so that the three-dimensional true color drawing mode is convenient for users to use, self-service of users is supported, and the use experience of users is improved.

In addition, by uploading the image data blocks without mapping relation to the cloud server, the cloud server can update the three-dimensional image frame database according to the image data blocks. For example, it can be transmitted to a dental professional to identify and judge the image data blocks and establish a label system for the image data blocks, wherein the label system can include block division, block number information, block image data, block image location information and the like, wherein the block image location information includes the spatial location relationship between each block. Furthermore, that three-dimensional image frame database can be continuously update and enriched. In this way, with the continuous use of the actual operation, the three-dimensional image frame database contains more abundant and comprehensive data. After a period of operation, the success rate of matching the image data blocks with the images of the blocks in the three-dimensional image frame database is improved, so that the three-dimensional image model of the user can be reconstructed and displayed, the viewing demand and experience of the user on the three-dimensional oral image can be greatly improved, the user can well view the specific location of the oral image, and the interaction effect is better.

Embodiment 4

Figure 5:
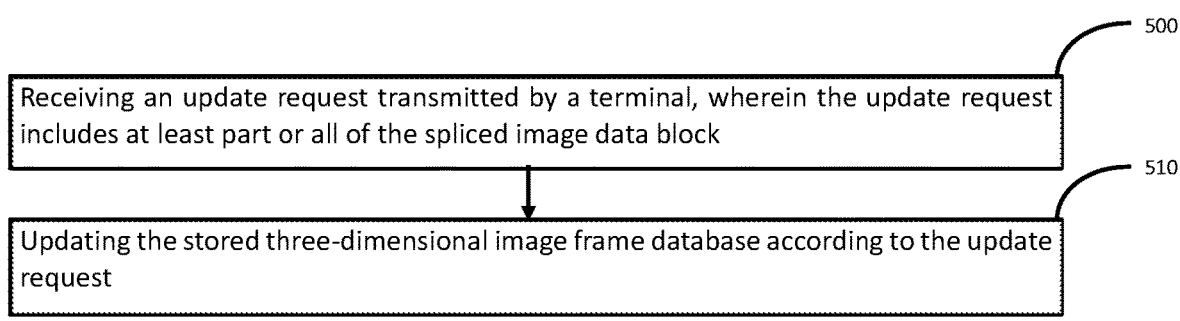
FIG. 5 is a flowchart of a method for updating a cloud server according to Embodiment 4 of the present invention.

Based on the above embodiment, referring to FIG. 5. In Embodiment 4 of the present invention, the specific flow of the updating method of the cloud server is as follows:

Step 500: receiving an update request transmitted by a terminal, wherein the update request includes at least part or all of the spliced image data block.

The spliced image data block is obtained after the terminal performs splicing processing according to the user's image data acquired by the endoscope, and the spliced image data block do not obtain mapping relation with blocks in the three-dimensional image frame database.

Step 510: updating the stored three-dimensional image frame database according to the update request.

Embodiment 4 of the present invention is mainly based on the above-mentioned third embodiment of the present invention. In which the cloud server only receives the image data block, and further can continuously update and perfect the three-dimensional image frame database according to the image data block. For details, please refer to the above-mentioned first to third embodiments, which will not be repeated here.

It is worth noting that in the first embodiment, it is also mentioned that with the operation of the image processing method of the embodiment of the present invention for a long time, the three-dimensional image frame database is continuously updated and improved. Therefore, during matching, there may not be unsuccessful matching, and image data blocks without mapping relation will not be obtained. The spliced image data block can obtain mapping relation with blocks in the three-dimensional image frame database. At this time, the user's three-dimensional image model and the recorded number information of the block that has been determined to obtain the mapping relationship with the spliced image data block are uploaded to the cloud server, so that the cloud server updates the three-dimensional image frame database according to the user's three-dimensional image model and the recorded number information of the block that has been determined to obtain the mapping relationship with the spliced image data block. Furthermore, the cloud server can continuously update the three-dimensional image frame database according to the user's three-dimensional image model and the recorded number information of the blocks which have been determined to obtain the mapping relation with the spliced image data block, thus improving and enriching the three-dimensional image frame database.

Embodiment 5

Based on the above embodiment, Embodiment 5 of the present invention is explained by taking as an example that every time one image data is received, a processing cycle is performed, and no image data block obtains a mapping relationship with a block in the three-dimensional image frame database in this processing, and after this processing is added, no image data block obtains a mapping relationship with a block in the three-dimensional image frame database since the endoscopic operation is started. Wherein, one processing cycle means one splicing, matching and displaying process.

Step A) receiving the 100th image data P (100) of the user acquired by an endoscope. The image data includes three-dimensional true color image data captured by an imaging unit in the endoscope, and the type of the image data is a depth image.

Step B) judging whether the image data P(1.00) and image data block sequences stirred in the system, respectively, such as each image data block Q'(1) . . . Q'(m) . . . Q'(9), M=9} can be spliced with each other.

After judgment, it is determined that the image data P(100) can be spliced with the stored second image data block Q'(2) and can be spliced with the stored fifth image data block Q'(5).

Therefore, the image data P(100), the image data block Q'(2) and the image data block Q'(5) are spliced to form a now image data block Q'(Temp).

Step C) judging whether the endoscope has been placed in the user's oral cavity.

If no, the stored image data blocks Q'(1), Q'(3), Q'(4), Q'(6), Q'(7), Q'(8), Q'(9), and the new image data blocks Q'(Temp) are arranged in order of the number or area of the included image data from large to small, thereby obtaining the current latest image data block sequence {Q'(1) . . . Q'(m), M=8} and saving it. Return to step A).

If yes, continue to Step D).

Step D) matching the image data block containing P(100), namely the image data block Q'(Temp). In the spliced image data block with the stored images of the blocks in the three-dimensional image frame database according to a preset image pattern recognition algorithm and based on the image feature information of the blocks in the three-dimensional image frame database.

Step E) displaying the spliced image data block according to the second preset display strategy matching, if the mapping relation between the new image data block Q'(Temp) and the blocks in the three-dimensional image frame database (i.e., T=0) cannot be obtained, and the specific method is as follows:

for the currently stored image data blocks Q'(1), Q'(3), Q'(4), Q'(6), Q'(7), Q'(8), Q'(9) and the new image data block Q'(Temp), the latest image data block sequence {Q'(1) . . . Q'(m) . . . Q'(8) M=8} is obtained after sorting from large to small order and stored.

If the number of display areas in the current display interface is 3, that is, d=3, the first 3 image data blocks Q'(1), Q'(2), Q'(3) are taken from the sorted image data blocks. In addition, three-dimensional true color images of the first three image data blocks taken out are respectively displayed in the three display areas.

The system returns to the previous step A).

For example, oral endoscopic sketch map: currently there are 3 display areas in the display interface.

Wherein, area 1 shows a three-dimensional true color image of Q'(1), for example, upper left 1 labial block and corresponding part of gum, upper left 2 labial block and corresponding part of gum, part of upper left 3 labial block and corresponding part of gum. Area 2 shows a three-dimensional true color image of Q'(2), for example, the right partial block of the upper right lip and the corresponding gum. Area 3 shows a three-dimensional true color image of Q'(3), for example, the lower left 4 lingual partial block and the corresponding gum.

Embodiment 6

Based on the above embodiment. In Embodiment 6 of the present invention, a processing cycle is performed once every time one image data is received, and the mapping relationship between one image data block and a block in the three-dimensional image frame database is obtained in this processing, and after this processing is added, the mapping relationship between one image data block and a block in the three-dimensional image frame database since the endoscopic operation is started is illustrated as an example. Wherein, one processing cycle means one splicing, matching and displaying process.

Step A) receiving the 120th image data P (120) of a user acquired by an endoscope, wherein the image data includes three-dimensional true color image data captured by an imaging unit in the endoscope, and the type of the image data is a depth image.

Step B) respectively judging whether the image data P(120) and each image data block Q'(1) . . . Q'(m) . . . Q'(16) in the image data block sequence {Q'(1) . . . Q'(m) . . . Q'(16) M=16} stored in the system can be spliced with each other.

After judgment, it is determined that the image data P(120) can be spliced with the first image data block Q'(1) stored in the system, and can be spliced with the third image data block Q'(3) stored in the system.

Therefore, the image data P(120), the image data block Q'(1) and the image data block Q'(3) are spliced to form a new image data block Q'(Temp).

Step C) judging whether the endoscope has been placed in the oral cavity of the user, and if so, continuing to execute Step D).

Step D) matching the spliced image data block containing P(120), namely the new image data block Q'(Temp), with the images of the blocks in the stored three-dimensional image frame database according to a preset image pattern recognition algorithm and based on the image feature information of the blocks in the three-dimensional image frame database.

Step E) after the matching, if the new image data block Q'(Temp) obtains the mapping relationship with the block in the three-dimensional image frame database, and since the start of this endoscopic operation, the new image data block Q'(Temp) is currently the only image data block (i.e., T=1) that obtains the mapping relationship with the block in the three-dimensional image frame database. Then the system processes the image data block as follows:

determining the block corresponding to the new image data block Q'(Temp) according to the mapping relation, determining the location of the block in the stored three-dimensional image contour of the user, and reconstructing the new image data block Q'(Temp) at the corresponding determined location in the three-dimensional image contour of the user to obtain the reconstructed three-dimensional image data, and update the currently stored user's three-dimensional image model according to the reconstructed three-dimensional image data.

Furthermore, the number information of each block in the mapping relation with the new image data block Q'(Temp) obtained by the matching operation in the three-dimensional image frame database is recorded. For example, the blocks that have been determined to obtain the mapping relationship include: If the upper left 1 tooth distal approximal surface block (No. 07.032.001), the upper left 1 tooth labial block (No. 07.037.001) and the upper right 1 tooth labial block (No. 07.042.001) are recorded, the number information of the block that has determined to obtain the mapping relationship is recorded as No. 07.032001, No. 07.037.001, No. 07.042.001.

For the aforementioned new image data block Q'(Temp), the system marks it as Q°(1) and records the image data block sequence {Q°(1)} that has obtained the mapping relation with the blocks in the three-dimensional image frame database.

For the currently stored image data blocks, i.e. other image data blocks Q'(2), Q'(4) . . . Q'(16) in the spliced image data block except those which have determined to obtain the mapping relationship are sorted according to the order of the number or area of the included image data from large to small, and the sorted current latest image data block sequence {Q'(1) . . . Q'(m) . . . Q'(14). M=14} is obtained and stored.

According to a first preset display strategy, all or part of the updated user's three-dimensional image model and other image data blocks in the spliced image data block except those which have determined to obtain a mapping relationship are displayed, specifically:

if the number of display areas in the current display interface is 3, that is, d=3, the first two image data blocks Q'(1) and Q'(2) are taken from the sorted image data blocks, and the three-dimensional true color images of the first two image data blocks and the updated three-dimensional image model of the user are respectively displayed in the three display areas. Specifically, the content displayed in area 1 is the updated three-dimensional image model of the user. For example, the user's three-dimensional image model includes the three-dimensional image contour of the user, and the right partial carved surface of the upper left 3 labial block, the upper left 2 labial block and corresponding partial gingiva, the upper left 1 labial block and corresponding partial gingiva, the upper right 1 labial block and corresponding gingiva, the left partial cured surface of the upper right 2 labial block and corresponding gingiva. Area 2 shows the three-dimensional true color image of image data block Q'(1). Area 3 shows the three-dimensional true color image of image data block Q'(2).

The system returns to the previous step A).

Embodiment 7

Based on the above-mentioned embodiments, the seventh embodiment of the present invention is explained by taking the mapping relationship between one image data block and a block in the three-dimensional image frame database for every image data received and the mapping relationship between two image data blocks and a block in the three-dimensional image frame database since the endoscopic operation is started as an example, wherein one processing cycle indicates that a splicing, matching and displaying process is performed.

Step A) receiving the 139th image data P (139) of the user acquired by an endoscope, wherein the image data includes three-dimensional true color image data captured by an imaging unit in the endoscope, and the type of the image data is a depth image.

Step B) respectively judging whether the image data P(139) and the image data block sequence {Q°(1)} among the data blocks stored in the system which have obtained the mapping relation with the blocks in the three-dimensional image frame database and each image data block Q°(1), Q'(1) . . . Q'(m) . . . Q'(18) in the image data block sequence {Q'(1) . . . Q'(m) . . . Q'(18), M=18} which have not obtained the mapping relation with the blocks in the three-dimensional image frame database can be spliced with each other.

After judgment, it is determined that the image data P(139) can be spliced with the image data block Q'(2) stored in the system and can be spliced with the image data block Q'(4) stored in the system.

Therefore, the image data P(139), the image data block Q'(2) and the image data block Q'(4) are spliced to form a new image data block Q'(Temp).

Step C) judging whether the endoscope has been placed in the oral cavity of the user, and if so, continuing to execute Step D).

Step D) according to a preset image pattern recognition algorithm and based on the image characteristic information of the blocks in the three-dimensional image frame database, the spliced image data block containing P(139), namely the new image data block Q'(Temp), is matched with the images of the blocks in the saved three-dimensional image frame database.

Step E) after the matching, if the new image data block Q'(Temp) obtains the mapping relationship with the block in the three-dimensional image frame database, and since the start of this endoscopic operation, the new image data block Q'(Temp) is currently the second image data block (i.e., T=2) to obtain the mapping relationship with the block in the three-dimensional image frame database. Then the system processes the image data block as follows:

determining the block corresponding to the new image data block Q'(Temp) according to the mapping relation, determining the location of the block in the stored three-dimensional image contour of the user, and reconstructing the new image data block Q'(Temp) at the corresponding determined location in the three-dimensional image contour of the user to obtain the reconstructed three-dimensional image data, and update the currently stored users three-dimensional image model according to the reconstructed three-dimensional image data.

Furthermore, the number information of each block in the three-dimensional image frame database that has determined to obtain the mapping relation with the new image data block Q'(Temp) is recorded. For example, the block with which the mapping relation with the image data block Q'(Temp) is obtained this time is the upper right 5 teeth buccal-side block (No. 07.062.001).

At this time, for example, before this mosaic matching process, that is, when the first image data block with the mapping relation to the blocks in the three-dimensional image frame database is obtained, the number information of the blocks with the mapping relation is 07.032.001, 07.037.001, 07.042.001. Then since the start of this endoscopic operation, the block numbers of all the blocks recorded that have determined the mapping relationship with the spliced image data block are: numbers 07.032.001, 07.037.001, 07.041001 and 07.062.001.

For the aforementioned new image data block Q'(Temp), the system records it as Q°(2) and records the image data block sequences {Q°(1), Q°(2)} that have obtained the mapping relation with the blocks in the three-dimensional image frame database.

For the currently stored image data blocks, i.e. other image data blocks Q'(1), Q'(3), Q'(5) . . . Q'(18) in the spliced image data block except those which have determined to obtain the mapping relationship are sorted according to the order of the number or area of the included image data from large to small, and the sorted current latest image data block sequence {Q'(1) . . . Q'(m) . . . Q'(16), M=16} is obtained and stored.

According to a first preset display strategy, all or part of the updated user's three-dimensional image model and other image data blocks in the spliced image data block except those which have determined to obtain a mapping relationship are displayed, it specifically includes:

if the number of display areas in the current display interface is 3, that is, d=3, the first two image data blocks Q'(1) and Q'(2) are taken from the sorted image data blocks, and the three-dimensional true color images of the first two image data blocks and the updated three-dimensional image model of the user are respectively displayed in the three display areas. Specifically, the content displayed in area 1 is the updated three-dimensional image model of the user. For example, the user's three-dimensional image model is a three-dimensional true color image with the three-dimensional image contour of the user and Q°(1) and Q°(2) image data blocks. For example, it includes the right partial curved surface of the upper left 3 labial block, the upper left 2 labial block and corresponding partial gingiva, the upper left 1 labial block and corresponding partial gingiva, the upper right 1 labial block and corresponding gingiva, the left partial curved surface of the upper right 2 labial block and corresponding gingiva, the right partial curved surface of the upper right 4 buccal-side block, the upper right 5 buccal-side block and corresponding gingiva, the upper right 6 buccal-side block partial curved surface and corresponding gingiva. Area 2 shows the three-dimensional true color image of image data block Q'(1). Area 3 shows the three-dimensional true color image of image data block Q'(2).

The system returns to the previous step A).

Embodiment 8

Based on the above-mentioned embodiments, Embodiment 8 of the present invention is explained by taking one processing cycle every time one image data is received, and one image data block obtains the mapping relationship with the block in the three-dimensional image frame database in this processing, and after this processing, the two previous image data blocks which have obtained the mapping relationship with the block in the three-dimensional image frame database are fused as an example. Wherein, one processing cycle means one splicing, matching and displaying process.

Step A) receiving the 168th image data P (168) of the user acquired by an endoscope. The image data includes three-dimensional true color image data captured by an imaging unit in the endoscope, and the type of the image data is a depth image.

Step B) respectively judging whether the image data P (168) and the image data blocks {Q°(1), Q°(2)} in the image data sequence stored in the system which have been determined to obtain the mapping relationship, and each image data block Q°(1), Q°(2)Q'(1) . . . Q'(m) . . . Q'(12) in the image data block sequence {Q'(1) . . . Q'(m) . . . Q'(12), M=12} which have not obtained the mapping relation with the blocks in the three-dimensional image frame database can be spliced with each other.

After the judgment, it is determined that the image data P(168) can be spliced with the image data block Q°(1) stored in the system and can be spliced with the image data block Q°(2) stored in the system.

Therefore, the image data P(168), the image data block Q°(1) and the image data block Q°(2) are spliced to form a new image data block Q'(Temp). At this time, the two previous image data blocks which have obtained the mapping relation with the blocks in the three-dimensional image frame database are fused together through P(168) to form a new image data block.

Step C) judging whether the endoscope has been placed in the oral cavity of the user, and if so, continuing to execute Step D).

Step D) matching the new image data block Q'(Temp) with the stored images of the blocks in the three-dimensional image frame database based on the image feature information of the blocks in the three-dimensional image frame database according to a preset image pattern recognition algorithm.

Step E) after the matching, if the new image data block Q'(Temp) obtains the mapping relationship with the block in the three-dimensional image frame database, and since the start of this endoscopic operation, the new image data block Q'(Temp) is currently the only image data block (i.e., T=1) that obtains the mapping relationship with the block in the three-dimensional image frame database. Then the system processes the image data block as follows:

According to the mapping relation, the block corresponding to the new image data block Q'(Temp) is determined, and the location of the block in the stored three-dimensional image contour of the user is determined, and the new image data block Q'(Temp) is reconstructed at the corresponding determined location in the three-dimensional image contour of the user to obtain the reconstructed three-dimensional image data, and the currently stored user's three-dimensional image model is updated according to the reconstructed three-dimensional image data.

In addition, the block number of each block in the three-dimensional image frame database that has determined the mapping relationship with the new image data block Q'(Temp) is recorded. For example, the blocks that have been determined to obtain the mapping relationship include: upper left 2 tooth labial block (No. 07.032.001), upper left 1 tooth labial block (No. 07.037.001), upper right 1 tooth labial block (No. 07.042.001), upper right 2 tooth labial block (No. 07.042.001), upper right 5 tooth buccal-side block (No. 07.062.001). Then the number information of the recorded blocks that have determined to obtain the mapping relationship are: 07.032.001, 07.037.001, 07.042.001, 07.047.001, 07.062.001.

For the aforementioned new image data block Q'(Temp), the system re-records it as Q°(1), and records the image data block sequence {Q°(1)} that has obtained the mapping relation with the blocks in the three-dimensional image frame database.

For the currently stored image data blocks, i.e. other image data blocks Q'(1), Q'(2), Q'(3) . . . Q'(12) in the spliced image data block except those which have determined to obtain the mapping relationship are sorted according to the order of the number or area of the included image data from large to small, and the sorted current latest image data block sequence {Q'(1) . . . Q'(m) . . . Q'(12), M=12} is obtained and stored.

According to a first preset display strategy, all or part of the updated user's three-dimensional image model and other image data blocks in the spliced image data block except those which have determined to obtain a mapping relationship are displayed, it specifically includes:

If the number of display areas in the current display interface is 3, that is, d=3, the first two image data blocks Q'(1) and Q'(2) are taken from the sorted image data blocks, and the three-dimensional true color images of the first two image data blocks and the updated three-dimensional image model of the user are respectively displayed in the three display areas. Specifically, area 1 shows the updated user's three-dimensional image model, wherein the users three-dimensional image model is a three-dimensional imago contour with the user and a three-dimensional true color image of the Q°(1) image data block. For example, it includes the right partial curved surface of the upper left 3 labial block, the upper left 2 labial block and corresponding partial gingiva, the upper left 1 labial block and corresponding partial gingiva, the upper right 1 labial block and corresponding gingiva, the upper right 2 labial block and corresponding gingiva, the upper right 2 distal approximal surface block and the three-dimensional true color curved surface between the upper right 4 teeth mesial approximal surface block, the upper right 5 teeth mesial approximal surface block, the upper right 5 teeth buccal-side block and corresponding gingiva, the upper right 6 teeth buccal-side block partial curved surface and corresponding gingiva. Area 2 shows the three-dimensional true color image of image data block Q'(1). Area 3 shows the three-dimensional true color image of image data block Q'(2).

The system returns to the previous stop A).

Embodiment 9

Based on the above-mentioned embodiments, Embodiment 9 of the present invention is explained by taking as an example that every time two pieces of image data are received, a processing cycle is performed, and no image data block is obtained in this processing to obtain a mapping relationship with a block in the three-dimensional image frame database, and after this processing is added, no image data block is obtained to obtain a mapping relationship with a block in the three-dimensional image frame database since the endoscopic operation is started. Wherein, one processing cycle means one splicing, matching and displaying process.

Step A) receiving the 100th and 101st image data P(100), P(101) of the user acquired by the endoscope, wherein the image data includes three-dimensional true color image data captured by an imaging unit in the endoscope, and the type of the image data is a depth image.

Step B) respectively judging whether the image data P(100) and P(101) can be spliced with each other, and whether they and each image data block Q'(1) ... Q'(m) ... Q'(16) in the image data block sequence {Q'(1) ... Q'(m) ... Q'(18), M=18} stored in the system can be spliced with each other.

After judgment, it is determined that the image data P(100) can be spliced with the second image data block Q'(2) stored in the system, and can be spliced with the fifth image data block Q'(5) stored in the system. The image data P(101) cannot be spliced with any other image data block.

Therefore, image data P(100), image data block Q'(2), and image data block Q'(5) are spliced to form a new image data block, denoted as Q'(Temp 1). The image data P(101) also constitutes an independent new image data block, denoted Q'(Temp 2).

Step C) judging whether the endoscope has been placed in the oral cavity of the user, and if so, continuing to execute Step D).

Step D) matching the new image data blocks Q'(Temp 1) and Q'(Temp 2) with the stored images of the blocks in the three-dimensional image frame database based on the image feature information of the blocks in the three-dimensional image frame database according to a preset image pattern recognition algorithm.

Step B) after the matching, if the mapping relationship between the new image data blocks Q'(Temp 1), Q'(Temp 2) and the blocks in the three-dimensional image frame database cannot be obtained (and since this endoscopic operation, no image data block has obtained the mapping relationship with the blocks in the three-dimensional image frame database before, i.e., T=0), then the spliced image data block are displayed according to the second preset display strategy, and the specific method is as follows:

For the currently stored image data blocks Q'(1), Q'(3), Q'(4), Q'(6), Q'(7) ... Q'(18), and new image data blocks Q'(Temp 1), Q'(Temp 2), they are sorted in order of the number or area of included image data from large to small to obtain the sorted current latest image data block sequence {Q'(1) ... Q'(m) ... Q'(18), M=18} and save it.

If the number of display areas in the current display interface is 3, that is, d=3, the first three image data blocks Q'(1), Q'(2), Q'(3) are taken from the sorted image data blocks, and the three-dimensional true color images of the first three image data blocks taken out are respectively displayed in the three display areas.

Figure 6:
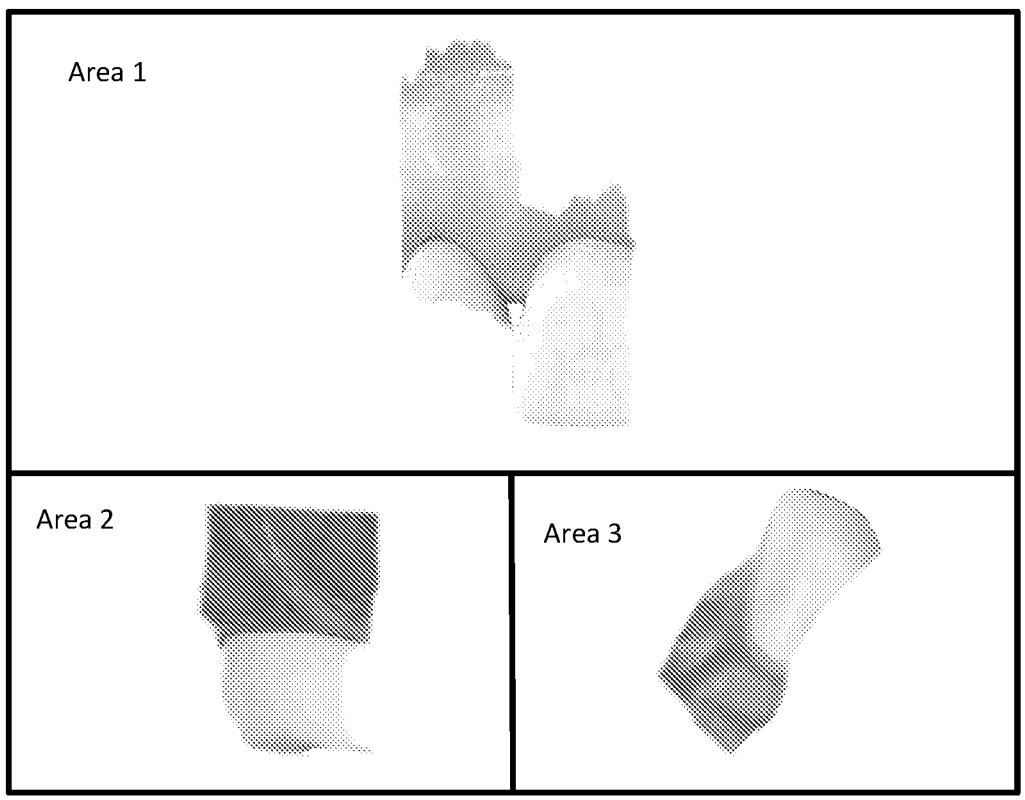
FIG. 6 is a schematic diagram of a three-dimensional image display effect according to Embodiment 9 of the present invention.

For example, referring to FIG. 6, the oral endoscopic schematic diagram shows that there are 3 display areas in the current display interface.

Wherein, the content displayed in area 1 is a three-dimensional true color image of Q'(1), for example, the right partial curved surface of the upper right 1 tooth labial block, the upper half curved surface of the upper right 1 tooth distal approximal surface block, the upper half curved surface of the upper right 2 tooth distal approximal surface block, the upper half of the upper right 2 tooth labial block, and the corresponding gum curved surface. Area 2 shows a three-dimensional true color image of Q'(2), for example, a partial curved surface of the palatal block of the upper right 6 teeth. Area 3 shows a three-dimensional true color image of Q'(3), for example, a partial curved surface of the lingual block of the lower left 3 teeth.

The system returns to the previous step A).

Embodiment 10

Based on the above-mentioned embodiments, Embodiment 10 of the present invention is explained by taking the example that every time two pieces of image data are received, a processing cycle is performed, and one image data block obtains a mapping relationship with a block in the three-dimensional image frame database in this processing, and after this processing is added, a total of one image data block obtains a mapping relationship with a block in the three-dimensional image frame database since the endoscopic operation is started, wherein, one processing cycle represents a splicing, matching and displaying process.

Step A) receiving the 120th and 121st image data P(120) and P (121) of the user acquired by the endoscope, wherein the image data includes three-dimensional true color image data captured by an imaging unit in the endoscope, and the type of the image data is a depth image.

Step B) respectively judging whether the image data P(120) and P(121) can be spliced with each other, and whether they and each image data block Q'(1) ... Q'(m) ... Q'(32) in the image data block sequence {Q'(1) ... Q'(m) ... Q'(32), M=18} stored in the system can be spliced with each other.

After judgment, it is determined that the image data P(120) can be spliced with the first image data block Q'(1) stored in the system, and can be spliced with the fourth image data block Q'(4) stored in the system. The image data P(121) cannot be spliced with any other image data block.

Therefore, image data P(120), image data block Q'(1) and image data block Q'(4) are spliced to form a new image data block, denoted as Q'(Temp 1). The image data P(101) also constitutes an independent new image data block, denoted Q'(Temp 2).

Step C) judging whether the endoscope has been placed in the oral cavity of the user, and if so, continuing to execute Step D).

Step D) according to a preset image pattern recognition algorithm, matching the image data blocks containing P(120) and P(121) in the spliced image data block, namely the new image data blocks Q'(Temp 1) and Q'(Temp 2), with the image features of the blocks in the stored three-dimensional image frame database based on the image feature information of the blocks in the three-dimensional image frame database.

Step E) after the matching, if the new image data block Q'(Temp 1) obtains the mapping relation with the blocks in the three-dimensional image frame database, and the new image data block Q'(Temp 2) cannot obtain the mapping relation with the blocks in the three-dimensional image frame database. Since the start of this endoscopic operation, the aforementioned new image data block Q'(Temp 1) is currently the only image data block (i.e., T=1) that obtains the mapping relationship with the blocks in the three-dimensional image frame database, then the system processes the image data block as follows: determining the block corresponding to the new image data block Q'(Temp 1) according to the mapping relation, determining the location of the block in the stored three-dimensional image contour of the user, and reconstructing the new image data block Q'(Temp 1) at the corresponding determined location in the three-dimensional image contour of the user to obtain the reconstructed three-dimensional image data, and update the currently stored user's three-dimensional image model according to the reconstructed three-dimensional image data.

In addition, the block numbers of each block in the mapping relation with the new image data block Q'(Temp 1) obtained by this matching operation in the three-dimensional image frame database are recorded. For example, the blocks that have been determined to obtain the mapping relationship include: the upper right 1 tooth distal approximal surface block (No. 07.045.001), the upper right 2 tooth proximal approximal surface block (No. 07.046.001), the upper right 2 tooth labial block and the corresponding gingival curved surface (No. 07.047.001), the upper right 2 tooth distal approximal surface block (No. 07.050.001), then the records include the data recorded since the start of this endoscopic operation. The block numbers of each block that has obtained the mapping relation with the spliced image data block are determined to be 07.045.001, 07.046.001, 07.047.001 and 07.050.001.

For the aforementioned new image data block Q'(Temp 1), the system records it as Q°(1) and records the image data block sequence {Q°(1)} that has obtained the mapping relation with the blocks in the three-dimensional image frame database.

For the currently stored image data blocks, i.e., other image data blocks Q'(2), Q'(3), Q'(5) . . . Q'(32) and new image data blocks Q'(Temp 2) in the spliced image data block except those which have determined to obtain mapping relations, are sorted in order of the number or area of the included image data from large to small, and the sorted current latest image data block sequence {Q'(1) . . . Q'(m) . . . Q'(31), M=31} is obtained and stored.

Figure 7:
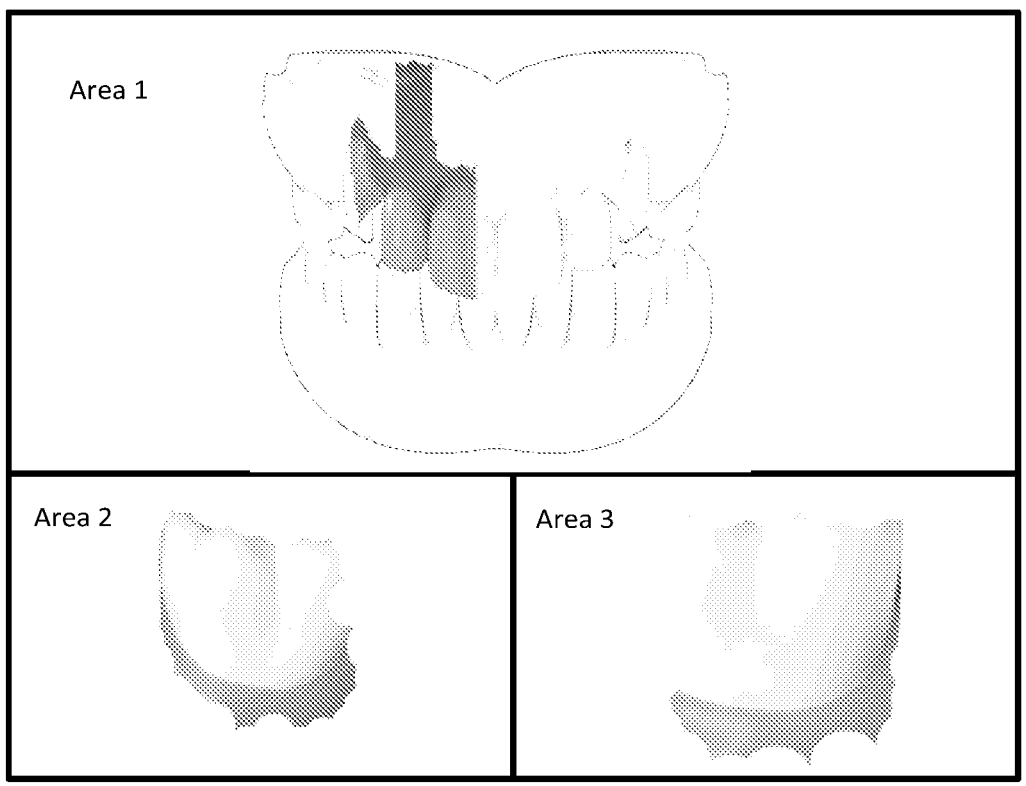
FIG. 7 is a schematic diagram of a three-dimensional image display effect according to Embodiment 10 of the present invention.

According to a first preset display strategy, all or part of the updated user's three-dimensional image model and other image data blocks in the spliced image data block except those which have determined to obtain a mapping relationship are displayed, it specifically includes:

If the number of display areas in the current display interface is 3, that is, d=3, the first two image data blocks Q'(1) and Q'(2) are taken from the sorted image data blocks, and the three-dimensional true color images of the first two image data blocks and the updated three-dimensional image model of the user are respectively displayed in the three display areas. Specifically, as shown in FIG. 7, area 1 shows the updated user's three-dimensional image model, which is a three-dimensional image contour with the user and a three-dimensional true color curved surface image of Q°(1), such as the right partial curved surface of the upper right 1 tooth labial block, the upper right 1 tooth distal approximal surface block, the upper right 2 tooth mesial approximal surface block, the upper right 2 tooth labial block and corresponding gingival curved surface, the upper right 2 tooth distal approximal surface block, and the upper right 3 tooth labial block left partial curved surface.

Area 2 shows the three-dimensional true color image of the image data block Q'(1), for example, the partial curved surface of the lingual block of the lower right 6 teeth.

Area 3 shows the three-dimensional true color image of the image data block Q'(2), for example, the partial curved surface of the lingual block of the lower left 4 teeth.

The system returns to the previous step A).

Embodiment 11

Based on the above-mentioned embodiments, Embodiment 11 of the present invention is explained by taking as an example that every time two pieces of image data are received, a processing cycle is performed, and one image data block in this processing obtains a mapping relationship with a block in the three-dimensional image frame database, and after this processing is added, a total of two image data blocks have obtained a mapping relationship with a block in the three-dimensional image frame database since the endoscopic operation is started, wherein, one processing cycle represents a splicing, matching and displaying process.

Step A) receiving the 138th and 139th image data P(138) and P(139) of the user acquired by the endoscope, wherein the image data includes three-dimensional true color image data captured by an imaging unit in the endoscope, and the type of the image data is a depth image.

Step B) respectively judging whether the image data P(138) and P(139) can be spliced to each other, and whether they can be spliced with the image data block {Q°(1)} in the image data sequence which has determined to obtain the mapping relationship with the blocks in the three-dimensional image frame database and each image data block Q°(1), Q'(1), Q'(m) . . . Q'(18) among the image data blocks {Q'(1) . . . Q'(m) . . . Q'(18), M=18} which have not obtained the mapping relationship with the blocks in the three-dimensional image frame database.

After judgment, it is determined that the image data P(139) can be spliced with the image data block Q'(3) stored in the system and can be spliced with the image data block Q'(5) stored in the system. The image data P(138) cannot be spliced with any other image data block.

Therefore, the spliced image data P(138) forms an independent new image data block, denoted as Q'(Temp 1). The image data P(139), the image data block Q'(3) and the image data block Q'(5) are spliced to form a new image data block, denoted as Q'(Temp 2).

Step C) judging whether the endoscope has been placed in the oral cavity of the user, and if so, continuing to execute Step D).

Step D) according to a preset image pattern recognition algorithm and based on the image feature information of the blocks in the three-dimensional image frame database, matching the spliced image data block containing P(138) or P(139), namely the new image data blocks Q'(Temp 1) and Q'(Temp 2) with the images of the blocks in the stored three-dimensional image frame database respectively.

Step E) after the matching, if the new image data block Q'(Temp 1) cannot obtain the mapping relation with the blocks in the three-dimensional image frame database, and the new image data block Q'(Temp 2) obtains the mapping relation with the blocks in the three-dimensional image frame database. Since the start of this endoscopic operation, the aforementioned new image data block Q'(Temp 2) is currently the second image data block (i.e., T=2) that obtains the mapping relationship with the blocks in the three-dimensional image frame database, then the system processes the image data block as follows:

determining the block corresponding to the new image data block Q'(Temp 2) according to the mapping relation, determining the location of the block in the stored three-dimensional image contour of the user, and reconstructing the new image data block Q'(Temp 2) at the corresponding determined location in the three-dimensional image contour of the user to obtain the reconstructed three-dimensional image data, and update the currently stored user's three-dimensional image model according to the reconstructed three-dimensional image data.

Furthermore, the block numbers of each block in the three-dimensional image frame database that has determined to obtain the mapping relationship with the aforementioned new image data block Q'(Temp 2) are recorded. For example, the blocks that have determined to obtain the mapping relationship include: the upper right 5 teeth mesial approximal surface block (No. 07.061.001) and the upper right 5 teeth buccal-side block (No. 07.062.001).

For example, before this matching, the number information of the blocks that have been recorded to obtain the mapping relationship are 07.045.001, 07.046.001, 07.017.001, 07.050.001. With the addition of the number information of the blocks that have been recorded this matching, the number information of all blocks that have been determined to obtain the mapping relationship with the spliced image data block since the start of this endoscopic operation is currently recorded as No. 07.045.001, 07.016.001, 07.017.001, 07.050.001, 07.061.001, 07.062.001.

For the aforementioned new image data block Q'(Temp 2), the system records it as Q°(2), and records the image data block sequences {Q°(1), Q°(2)} that have obtained the mapping relation with the blocks in the three-dimensional image frame database.

For the currently stored image data blocks, i.e. other image data blocks Q'(1), Q'(2), Q'(4), Q'(6) . . . Q'(18) and new image data blocks Q'(Temp 1) in the spliced image data block except those which have been determined to obtain the mapping relationship are sorted according to the order of the number or area of the included image data from large to small, and the soiled current latest image data block sequence {Q' (1) . . . Q'(m) . . . Q'(17), M=17} is obtained and stored.

Figure 8:
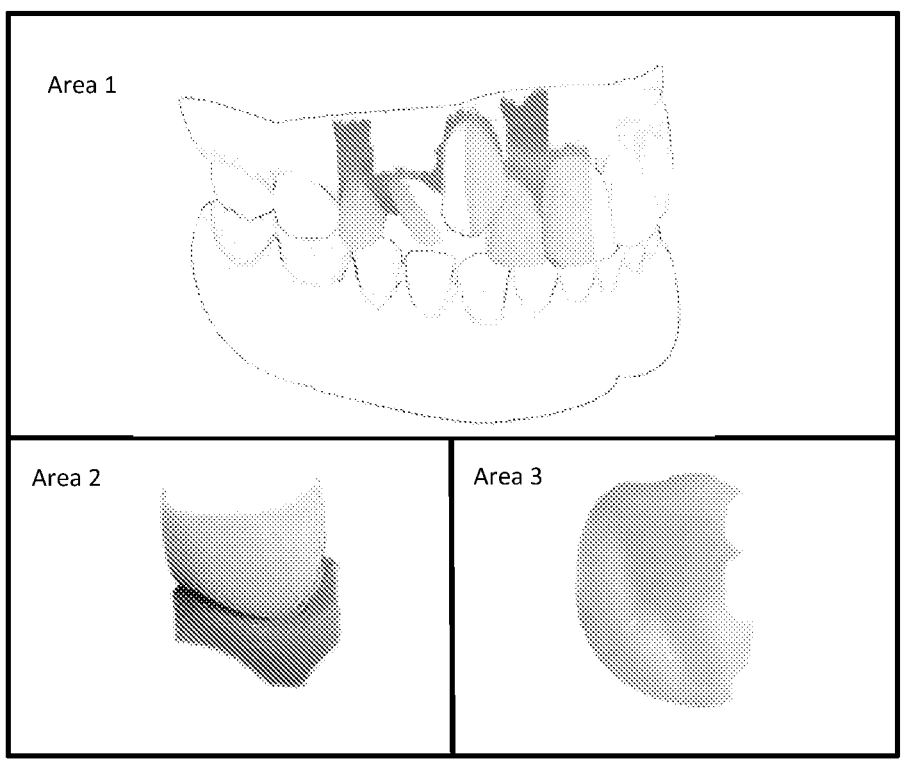
FIG. 8 is a schematic diagram of a three-dimensional image display effect according to Embodiment 11 of the present invention.

According to a first preset display strategy, all or part of the updated user's three-dimensional image model and other image data blocks in the spliced image data block except those which have determined to obtain a mapping relationship are displayed, it specifically includes:

If the number of display areas in the current display interface is 3, that is, d=3, the first two image data blocks Q'(1) and Q'(2) are taken from the sorted image data blocks, and the three-dimensional true color images of the first two image data blocks and the updated three-dimensional image model of the user are respectively displayed in the three display areas. Specifically, referring to FIG. 8, the contents shown in area 1 are: The updated user's three-dimensional image model is a three-dimensional true color image with the three-dimensional image contour of the user and Q°(1) and Q°(2) image data blocks. For example, the three-dimensional true color curved surface image of Q°(1) is the right partial curved surface of the upper right 1 tooth labial block, the upper right 1 tooth distal approximal surface block, the upper right 2 tooth mesial approximal surface block, the upper right 2 tooth labial block and the corresponding gum curved surface, the upper right 2 tooth distal approximal surface block, and the left partial curved surface of the upper right 3 tooth labial block. The three-dimensional true color curved surface image of Q°(2) is the right partial curved surface of the buccal-side block of the upper right 4 teeth, the mesial adjacent area of the upper right 5 teeth, the buccal-side block oldie upper right 5 teeth and the corresponding gums.

Area 2 shows a three-dimensional true color image of the image data block Q'(1), for example, a partial curved surface of the buccal-side block of the lower left 5 teeth.

Area 3 shows the three-dimensional true color image of image data block Q'(2), for example, the partial curved surface of the lower left 4 teeth occlusal surface block.

The system returns to the previous step A).

Embodiment 12

Based on the above embodiments. In Embodiment 12 of the present invention, the processing cycle is performed once for every two pieces of image data received, and the mapping relationship with the blocks in the three-dimensional image frame database is not obtained in this processing, but since the endoscopic operation is started, the mapping relationship between the two image data blocks and the blocks in the three-dimensional image frame database has been obtained before this processing as an example. Wherein, one processing cycle means one splicing, matching and displaying process.

Step A) receiving the 152th and 153th image data P(152) and P (153) of the user acquired by the endoscope, wherein the image data includes three-dimensional true color image data captured by an imaging unit in the endoscope, and the type of the image data is a depth image.

Step B) respectively judging whether the image data P(152) and P(139) can be spliced to each other, and whether they can be spliced with the image data blocks {Q'(1), Q°(2)} in the image data sequence which has determined to obtain the mapping relationship and each image data block Q°(1), Q°(2), Q'(1) . . . Q'(m) . . . Q'(21) among the image data blocks {Q'(1) . . . Q'(m) . . . Q'(21), M=21} which have not obtained the mapping relationship.

After judgment, it is determined that the image data P(152) can be spliced with the image data block Q'(3) stored in the system. The image data P(153) cannot be spliced with any other image data block, for example, a partial curved surface of the lower left 4 teeth occlusal surface block.

Therefore, the image data P(152) and the image data block Q'(3) are spliced to form a new image data block, denoted as Q'(Temp 1). The image data P(153) forms an independent new image data block, denoted Q'(Temp 2).

Step C) judging whether the endoscope has been placed in the oral cavity of the user, and if so, continuing to execute Step D).

Step D) according to the stored three-dimensional image frame database and the preset image pattern recognition algorithm, and based on the image feature information of the blocks in the three-dimensional image frame database, matching the image data blocks containing P(152) and P(153) in the spliced image data block, namely the new image data blocks Q'(Temp 1) and Q'(Temp 2) with the images of the blocks in the stored three-dimensional image frame database.

Step E) after the matching, if the new image data blocks Q'(Temp 1) and Q'(Temp 2) cannot obtain the mapping relationship with the blocks in the three-dimensional image frame database, since the start of this endoscopic operation, the image data blocks that have obtained the mapping relationship with the blocks in the three-dimensional image frame database are still the image data blocks Q°(1) and Q°(2) in the image data block sequences {Q°(1), Q°(2)} stored in the system, then the system processes the image data blocks as follows:

the image data block sequences {Q°(1), Q°(2)} that have obtained the mapping relation with the blocks in the three-dimensional image frame database remain unchanged.

The currently stored three-dimensional image model of the user remains unchanged, and the number information of each block that has determined to obtain the mapping relation with the spliced image data block has not changed since the start of the recorded endoscopic operation.

For the currently stored image data blocks Q'(1), Q'(2), Q'(4), Q'(5) . . . Q'(21), and the new image data blocks Q'(Temp 2), which have not obtained the mapping relation with the blocks in the three-dimensional image frame database, the sequence is sorted from large to small according to the number or area of the included image data, and the sorted current latest image data block sequence {Q' (1) . . . Q'(m) . . . Q'(21), M=21} is obtained and stored.

According to a first preset display strategy, all or part of the currently stored user's three-dimensional image model and other image data blocks in the spliced image data block except those which have determined to obtain mapping relations are displayed, it specifically includes:

if the number of display areas in the current display interface is 3, that is, d=3, the first two image data blocks Q'(1) and Q'(2) are taken from the sorted image data blocks, and the three-dimensional true color images of the first two image data blocks and the three-dimensional image models of the currently stored user are respectively displayed in the three display areas, specifically:

Area 1 shows the currently stored user's three-dimensional image model, which is a three-dimensional true color image with the three-dimensional image contour of the user and Q°(1) and Q°(2) image data blocks. For example, the three-dimensional true color curved surface image of Q°(1) is the right partial curved surface of the upper right 1 tooth labial block, the upper right 1 tooth distal approximal surface block, the upper right 2 tooth mesial approximal surface block, the upper right 2 tooth labial block and the corresponding gum curved surface, the upper right 2 tooth distal approximal surface block, and the left partial curved surface of the upper right 3 tooth labial block. The three-dimensional true color curved surface image of Q°(2) is the right partial curved surface of the buccal side block of the upper right 4 teeth, the mesial adjacent area of the upper right 5 teeth, the buccal-side block of the upper right 5 teeth and the corresponding gums.

Area 2 shows the three-dimensional true color image of the image data block Q'(1), for example, the partial curved surface of the occlusal surface block of the lower left 5 tooth. Note: Since this image data block splices image data P(152), its area will be larger than that of the image data block shown before splicing.

Area 3 shows the three-dimensional true color image of the image data block Q'(2), for example, a partial curved surface of the buccal-side block of the lower left 4 teeth.

The system returns to the previous step A).

Embodiment 13

Based on the above embodiment, Embodiment 13 of the present invention is explained by taking the example of once processing cycle for every two pieces of image data received, and one image data block obtains the mapping relation with the block in the three-dimensional image frame database in this processing, and after this processing, the previous two image data blocks which have obtained the mapping relation with the block in the three-dimensional image frame database are fused, wherein, one processing cycle represents one splicing, matching and displaying process.

Step A) receiving the 168th and 169th image data P(168) and P (169) of the user acquired by the endoscope, wherein the image data includes three-dimensional true color image data captured by an imaging unit in the endoscope, and the type of the image data is a depth image.

Step B) respectively judging whether the image data P(168) and P(169) can be spliced to each other, and whether they can be spliced with the image data blocks {Q°(1), Q°(2)} in the image data sequence which has determined to obtain the mapping relationship and each image data block Q°(1), Q°(2), Q'(1) . . . Q'(m) . . . Q'(12) among the image data blocks {Q' (1) . . . Q'(m) . . . Q'(12), M=12} which have not obtained the mapping relationship.

After judgment, it is determined that the image data P(168) can be spliced with the image data block Q°(1) stored in the system and can be spliced with the image data block Q°(2) stored in the system. The image data P(169) cannot be spliced with any other image data block.

Therefore, image data P(168), image data block Q°(1), and image data block Q°(2) are spliced to form a new image data block, denoted as Q'(Temp 1). The image data P(169) constitutes an independent new image data block, denoted Q'(Temp 2).

Step C) judging whether the endoscope has been placed in the oral cavity of the user, and if so, continuing to execute Step D).

Step D) according to a preset image pattern recognition algorithm and based on the image feature information of the blocks in the three-dimensional image frame database, matching the spliced image data block containing P(168) and P(169), namely the new image data blocks Q'(Temp 1) and Q'(Temp 2) with the images of the blocks in the stored three-dimensional image frame database.

Step E) after the matching, if the new image data block Q'(Temp 1) obtains the mapping relation with the blocks in the three-dimensional image frame database, and the new image data block Q'(Temp 2) cannot obtain the mapping relation with the blocks in the three-dimensional image frame database. The aforementioned new image data block Q'(Temp 1) is the only image data block (i.e., =1) that has obtained the mapping relationship with the blocks in the three-dimensional image frame database since the start of the endoscopic operation, then the system processes the image data block as follows:

determining the block corresponding to the new image data block Q'(Temp 1) according to the mapping relation, determining the location of the block in the stored three-dimensional image contour of the user, and reconstructing the new image data block Q'(Temp 1) at the corresponding determined location in the three-dimensional image contour of the user to obtain the reconstructed three-dimensional image data, and update the currently stored uses three-dimensional image model according to the reconstructed three-dimensional image data.

In addition, during this matching operation, the block number of each block in the three-dimensional image frame database that has determined to obtain the mapping relation with the new image data block Q'(Temp 1) is recorded. For example, the blocks that have been determined to obtain the mapping relationship include: upper right 1 tooth mesial approximal surface block (No. 07.041.001), upper right 1 tooth labial block (No. 07.042.001), upper right 1 tooth mesial approximal surface block (No. 07.045.001), upper right 2 tooth mesial approximal surface block (No. 07.046.001), upper right 2 tooth labial block (No. 07.047.001), upper right 2 teeth distal approximal surface block (No. 07.050.001), upper right 5 teeth mesial approximal surface block (No. 07.061.001), and upper right 5 teeth buccal-side block (No. 07.062.001). Then since the start of this endoscopic operation, the recorded number information of the blocks that have been determined to obtain the mapping relationship are: number 07.041.001, number 07.042.001, number 07.045.001, number 07.046.001, number 07.047.001, number 07.050.001, number 07.061.001, number 07.062.001.

For the aforementioned new image data block Q'(Temp 1), the system records it as $Q°(1)$ and records the image data block sequence $\{Q°(1)\}$ that has obtained the mapping relation with the blocks in the three-dimensional image frame database.

For the currently stored image data blocks, i.e., other image data blocks Q'(1), Q'(2), Q'(3) . . . Q'(12) and new image data blocks Q'(Temp2) in the spliced image data block except for the determined mapping relationship, are sorted according to the number of area of the included image data from large to small to obtain the sorted current latest image data block sequence {Q'(1) . . . Q'(m) . . . Q'(13), M=13} and are stored.

Figure 9:
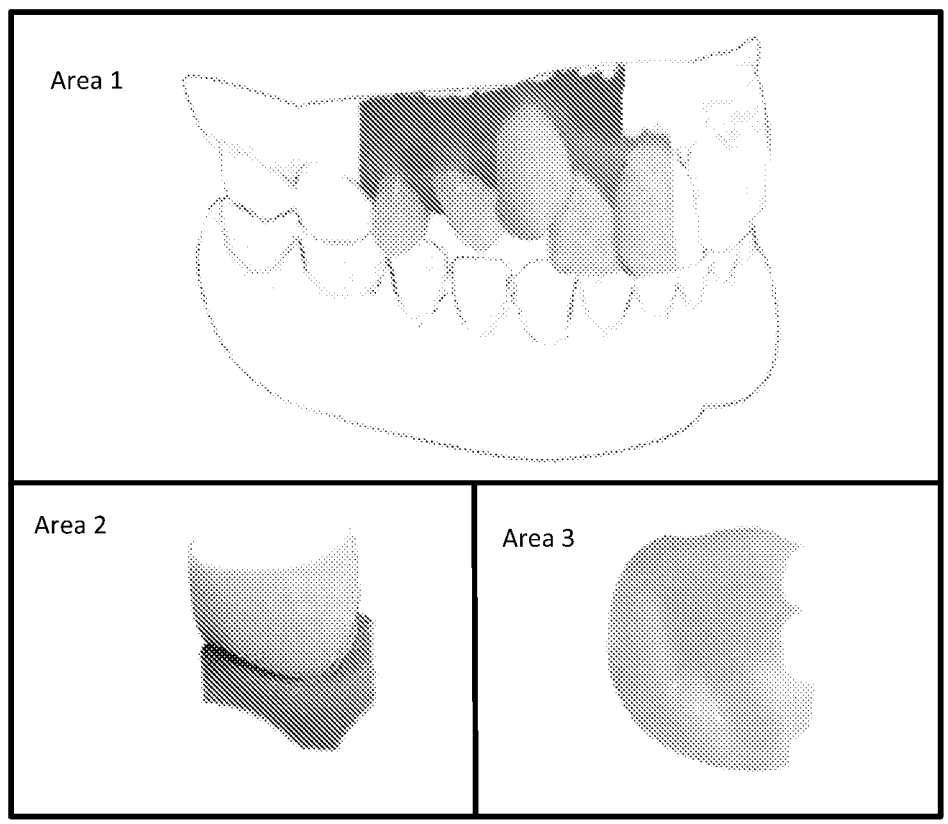
FIG. 9 is a schematic diagram of a three-dimensional image display effect according to Embodiment 13 of the present invention.

According to a first preset display strategy, all or part of the updated user's three-dimensional image model and other image data blocks in the spliced image data block except those which have determined to obtain a mapping relationship are displayed, it specifically includes:

If the number of display areas in the current display interface is 3, that is, d=3, the first two image data blocks Q'(1) and Q'(2) are taken from the sorted image data blocks, and the three-dimensional true color images of the first two image data blocks and the updated three-dimensional image model of the user are respectively displayed in the three display areas, specifically:

Referring to FIG. 9, area 1 shows the updated three-dimensional image model of the user, which is the three-dimensional image contour with the user and the three-dimensional true color image of the Q'(1) image data block. For example, the three-dimensional true color image of the $Q°(1)$ image data block is the right partial curved surface of the upper right 1 tooth labial block, the upper right 1 tooth distal approximal surface block, the upper right 2 tooth mesial approximal surface block, the upper right 2 tooth labial block and the corresponding gum curved surface, and the upper right 2 tooth distal approximal surface block; the three-dimensional true color curved surface between the upper right 2 teeth distal approximal surface block and the upper right 5 teeth mesial approximal surface block; the upper right 5 teeth mesial approximal surface block, the upper right 5 teeth buccal-side block and the corresponding gums.

Area 2 shows a three-dimensional true color image of the image data block Q'(1), for example, a partial curved surface of the buccal-side block of the lower left 5 teeth.

Area 3 shows the three-dimensional true color image of image data block Q'(2), for example, the partial curved surface of the lower left 4 teeth occlusal surface block.

The system returns to the previous step A).

Embodiment 14

Based on the above embodiment, Embodiment 14 of the present invention, a processing cycle is performed every time 6 pieces of image data are received, and a mapping relationship between one image data block and a block in the three-dimensional image frame database is obtained in this processing, and after this processing is added, a mapping relationship between two image data blocks and a block in the three-dimensional image frame database since the endoscopic operation is started is taken as an example to explain. Wherein, one processing cycle means one splicing, matching and displaying process.

For example, every time H pieces of image data with the same sequence stamp and different imaging unit numbers are received, for example, F=3, H=2, that is, F*H=3*2=6 pieces of image data, a subsequent processing step is executed, that is, 3*2=6 pieces of newly acquired image data are processed each time.

Step A) receiving the total 6 image data P(138), P(139), P(140), P(141), P(142), p (143), rarely the 138th the 139th, the 140th, the 141th, the 142th and the 143th image data, acquired by the endoscope from the user;

Wherein the image data includes three-dimensional true color image data captured by an imaging unit in the endoscope and P(138) and P(139) are two image data with the same time sequence stamp (r=69) and imaging unit numbers of 1 and 2 respectively; P(140) and P(141) are two pieces of image data with the same time sequence stamp (r=70) and imaging unit numbers of 1 and 2 respectively; P(142) and P(143) are two pieces of image data with the same time sequence stamp (r=71) and imaging unit numbers of 1 and 2 respectively; moreover, the type of the image data is a depth image.

Step B) respectively judging whether the image data P(138), P(139), P(140), P(141), P(142) and P(143) can be spliced to each other, and whether they can be spliced with the image data block $\{Q°(1)\}$ in the image data sequence which has determined to obtain the mapping relationship with the blocks in the three-dimensional image flume database and each image data block $Q°(1)$, Q'(1), Q'(m) . . . Q'(18) among the image data blocks {Q'(1) . . . Q'(m) . . . Q'(18), M=18} which have not obtained the mapping relationship with the blocks in the three-dimensional image frame database.

After judgment, it is determined that image data P(138), P(140) and P(142) can be spliced, and image data P(139), P(141) and P(143) can be spliced; the image data block formed after the image data P(139), P(141) and P(143) are spliced can be spliced with the image data block Q'(3) stored in the system and can be spliced with the image data block Q'(5) stored in the system; the image data block formed after the image data P(138), P(140), and P(112) are spliced cannot be spliced with any other image data block.

Therefore, the image data blocks formed by splicing the image data P(138), P(140) and P(112) form an independent new image data block, denoted as Q'(Temp 1). The image data P(139), P(141), P(143), image data block Q'(3), and image data block Q'(5) are spliced to form a new image data block, denoted as Q'(Temp 2).

Step C) judging whether the endoscope has been placed in the oral cavity of the user, and if so, continuing to execute Step D).

Step D) matching the now image data blocks Q'(Temp 1) and Q'(Temp 2) with the images of the blocks in the three-dimensional image frame database based on the image feature information of the blocks in the three-dimensional image frame database according to a preset image pattern recognition algorithm.

Step E) after the matching, if the new image data block Q'(Temp 1) cannot obtain the mapping relation with the blocks in the three-dimensional image frame database, the new image data block Q'(Temp 2) obtains the mapping relation with the blocks in the three-dimensional image frame database. Since the start of this endoscopic operation, the aforementioned new image data block Q'(Temp 2) is currently the second image data block (i.e., T=2) that obtains the mapping relationship with the blocks in the three-dimensional image frame database, then the system processes the image data block as follows:

determining the block corresponding to the new image data block Q'(Temp 2) according to the mapping relation, determining the location of the block in the stored three-dimensional image contour of the user, and reconstructing the new image data block Q'(Temp 2) at the corresponding determined location in the three-dimensional image contour of the user to obtain the reconstructed three-dimensional image data, and update the currently stored user's three-dimensional image model according to the reconstructed three-dimensional image data.

Furthermore, the block numbers of each block in the three-dimensional image frame database that has determined to obtain the mapping relationship with the aforementioned new image data block Q'(Temp 2) are recorded. For example, the blocks that have determined to obtain the mapping relationship include: the upper right 5 teeth mesial approximal surface block (No. 07.061.001) and the upper right 5 teeth buccal-side block (No. 07.062.001).

For example, before this matching process, the number information of the blocks that have already been recorded to obtain the mapping relationship is 07.045.001, 07.046.001, 07.047.001, 07.050.001, then the number information of the blocks that have obtained the mapping relationship with the spliced image data block is determined to be No. 07.045.001, 07.046.001, 07.047.001, 07.050.001, 07.061.001, 07.062.001.

For the aforementioned new image data block Q'(Temp 2), the system records it as Q°(2), and records the image data block sequences {Q°(1), Q°(2)} that have obtained the mapping relation with the blocks in the three-dimensional image frame database.

For the currently stored image data blocks, i.e. other image data blocks Q'(1), Q'(2), Q'(4), Q'(6) . . . Q'(18) and new image data blocks Q'(Temp 1) in the spliced image data block except those which have been determined to obtain the mapping relationship are sorted according to the order of the number or area of the included image data from large to small, and the sorted current latest image data block sequence {Q'(1) . . . Q'(m) . . . Q'(17), M=17} is obtained and stored.

According to a first preset display strategy, all or part of the updated user's three-dimensional image model and other image data blocks in the spliced image data block except those which have determined to obtain a mapping relationship are displayed, it specifically includes:

If the number of display areas in the current display interface is 3, that is, d=3, the first two image data blocks Q'(1) and Q'(2) are taken from the sorted imago data blocks, and the three-dimensional true color images of the first two image data blocks and the updated three-dimensional image model of the user are respectively displayed in the three display areas, specifically:

Area 1 shows the updated three-dimensional image model of the user, and the three-dimensional image block module of the user is a three-dimensional true color image with the user's three-dimensional image contour and Q°(1) and Q°(2) image data blocks. For example, the three-dimensional true color curved surface image of Q°(1) is the right partial curved surface of the upper right 1 tooth labial block, the upper right 1 tooth distal approximal surface block, the upper right 2 tooth mesial approximal surface block, the upper right 2 tooth labial block and the corresponding gum curved surface, the upper right 2 tooth distal approximal surface block, and the left partial curved surface of the upper right 3 tooth labial block. The three-dimensional true color curved surface image of Q°(2) is the right partial curved surface of the buccal-side block of the upper right 4 teeth, the mesial adjacent area of the upper right 5 teeth, the buccal-side block of the upper right 5 teeth and the corresponding gums.

Area 2 shows a three-dimensional true color image of the image data block Q'(1), for example, a partial curved surface of the buccal-side block of the lower left 5 teeth.

Area 3 shows the three-dimensional true color image of image data block Q'(2), for example, the partial curved surface of the lower left 4 teeth occlusal surface block.

The system returns to the previous step A).

Embodiment 15

Figure 10:
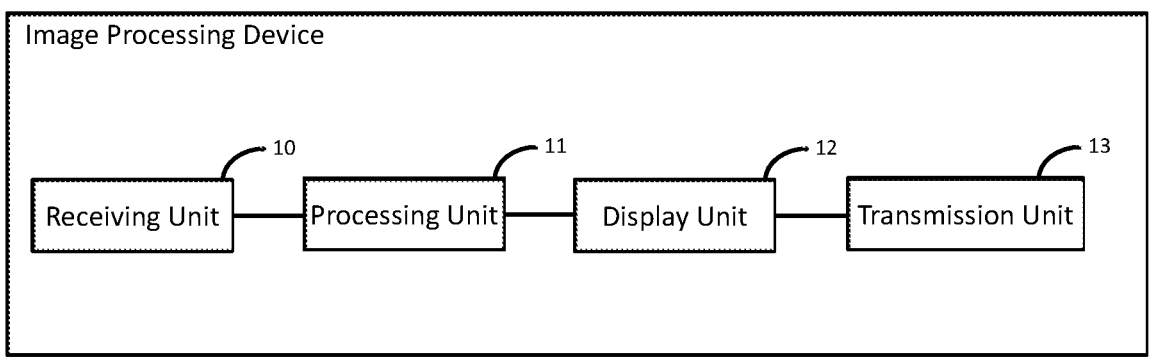
FIG. 10 is a schematic structural diagram of an image processing device according to Embodiment 15 of the present invention.

Based on the above embodiment, referring to FIG. 10. In Embodiment 15 of the present invention, the image processing device specifically includes:

a receiving unit 10, configured to acquire the image data of a user acquired by an endoscope, wherein the image data includes at least image data captured by an imaging unit in the endoscope, and the type of the image data is a depth image. The acquired image data of the user indicates that splicing processing has not been performed.

a processing unit 11, configured to splice the image data and/or the image data and the stored image data block to obtain a spliced image data block, wherein the image data block includes at least one image data; match the image data blocks containing the image data in the spliced image data block with the images of the blocks in the stored three-dimensional image frame database, respectively, and if it is determined to obtain a mapping relation between at least one image data block containing the image data and a block in the three-dimensional image frame database, the location of the block corresponding to the at least one image data block containing the image data in the stored three-dimensional image contour of the user is determined according to the mapping relation, and the at least one image data block containing the image data is reconstructed on the determined location corresponding to the three-dimensional image contour of the user to obtain the reconstructed three-dimensional image data, and the currently stored three-dimensional image model of the user is updated according to the reconstructed three-dimensional image data; wherein the three-dimensional image frame database stores image data of blocks dividing the three-dimensional image frame image of and location information of images of each block; the image data of the block includes number information and image feature information, and the initial value of the user's three-dimensional image model is the three-dimensional image contour of the user;

a display unit 12, configured to display all or part of the updated three-dimensional image model of the user and other image data blocks in the spliced image data block except those that have determined to obtain a mapping relationship according to a first preset display strategy;

a transmission unit 13, configured to update the updated three-dimensional image model of the user and the recorded number information of the blocks determined to obtain the mapping relationship to a cloud server, and upload part or all of the spliced image data block except the image data blocks which have determined to obtain the mapping relation with the blocks in the three-dimensional image frame database are uploaded to the cloud server according to a preset rule, if it is determined that the preset condition is satisfied, so that the cloud server updates the stored three-dimensional image frame database according to the updated three-dimensional image model of the user and the number information of the blocks which have determined to obtain the mapping relation and part or all of the spliced image data block except the image data blocks which have determined to obtain the mapping relation with the blocks in the three-dimensional image frame database.

Preferably, the location information of the image of the block includes: the spatial location relationship between each block;

the image of each block in the three-dimensional image contour is a three-dimensional curved surface shape based on the image of the block in the three-dimensional image frame database or the three-dimensional image model of the user, and comprises a preset image with a single color and a single texture.

Preferably, before the step of matching the image data blocks containing the image data in the spliced image data block with the images of the blocks in the stored three-dimensional image frame database, respectively, the processing unit 11 is further configured to:

determine the endoscope to have been placed in the oral cavity according to the spliced image data block and the preset image pattern recognition algorithm.

Preferably, according to a first preset display strategy, all or part of the updated three-dimensional image model of the user and other image data blocks in the spliced image data block except those that have determined to obtain a mapping relationship are displayed. The display unit 12 is specifically configured to:

sort the spliced image data block except other image data blocks which have determined to obtain mapping relation from large to small according to the area of the image data blocks or the number of image data included in the image data blocks;

Determine the number d of display areas in the current display interface and the member n of other image data blocks in the spliced image data block except those which have determined to obtain a mapping relationship, and judging the values of a and d−1;

if n is not less than d−1, the first d−1 image data blocks are extracted from the sorted image data blocks, and the updated three-dimensional image model of the user and the extracted first d−1 image data blocks are sequentially displayed in the d display areas, respectively;

If n is less than d−1, the number of display areas in the current display interface is adjusted so that the number of display areas is the same as n+1, and the updated three-dimensional image model of the user and the sorted image data blocks are sequentially displayed in the display areas in the adjusted current display interface, respectively.

Preferably, the processing unit 11 is further configured to:

record the number information of the block determined to obtain the mapping relationship according to the mapping relationship if it is determined to obtain a mapping relationship between at least one image data block containing the image data and a block in the three-dimensional image frame database.

Preferably, the processing unit 11 is further configured to, if it is determined that the mapping relationship between the image data block containing the image data and the block in the three-dimensional image frame database is not obtained, and at least one of the spliced image data block has obtained the mapping relationship with the block in the three-dimensional image frame database, the display unit 12 is further configured to:

display all or part of the currently stored three-dimensional image model of the user and other image data blocks in the spliced image data block except those which have determined to obtain a mapping relationship according to a first preset display strategy.

Preferably, according to a first preset display strategy, all or part of the currently stored three-dimensional image model of the user and other image data blocks in the spliced image data block except those that have determined to obtain a mapping relationship are displayed. The display unit 12 is specifically configured to:

sort the spliced image data block except other image data blocks which have determined to obtain mapping relation from large to small according to the area of the image data blocks or the number of image data included in the image data blocks;

determine the number d of display areas in the current display interface and the number n of other linage data blocks in the spliced image data block except those which have determined to obtain a mapping relationship, and judge the values of n and d−1;

if n is not less than d−1, the first d−1 image data blocks are extracted from the sorted image data blocks, and the currently stored three-dimensional image model of the user and the extracted first d−1 image data blocks are sequentially displayed in the d display areas, respectively;

if n is less than d−1, the number of display areas in the current display interface is adjusted so that the number of display areas is the same as n+1, and the currently stored three-dimensional image model of the user and the sorted image data blocks are sequentially displayed in the display areas in the adjusted current display interface, respectively.

Preferably, the processing unit 11 is further configured to, if it is determined that the mapping relationship between the image data block containing the image data and the block in the three-dimensional image frame database is not obtained, and the image data block with the mapping relationship with the block in the three-dimensional image frame database is not obtained in the spliced image data block, the display unit 12 is further configured to:

display all or part of the spliced image data block according to a second preset display strategy.

Preferably, according to a second preset display strategy, all or part of the spliced image data block is displayed, and the display unit 12 is specifically configured to:

sort the spliced image data block from large to small according to the area of the image data blocks or the number of the image data blocks containing the image data if the number of the spliced image data block is a;

determine the number d of display areas in the current display interface and judge the values of a and d, if a is not less than d, take out the first d image data blocks from the sorted a image data blocks, and sequentially display the taken out first d image data blocks in the d display areas, respectively; if a is less than d, adjust the number of display areas in the current display interface so that the number of display areas is the same as a, and sequentially display the a image data blocks in the display areas in the adjusted current display interface, respectively.

Preferably, before splicing the image data, and the image data and the stored image data blocks, the processing unit 11 is further configured to:

determine that the number of the image data is larger than a preset threshold value.

Preferably, the receiving unit 10 is further configured to, after the display unit 12 displays all or part of the updated three-dimensional image model of the user and other image data blocks in the spliced image data block except those that have determined to obtain the mapping relationship according to a first preset display strategy, return to perform acquisition of the image data of the user acquired by the endoscope.

Embodiment 16

Figure 11:
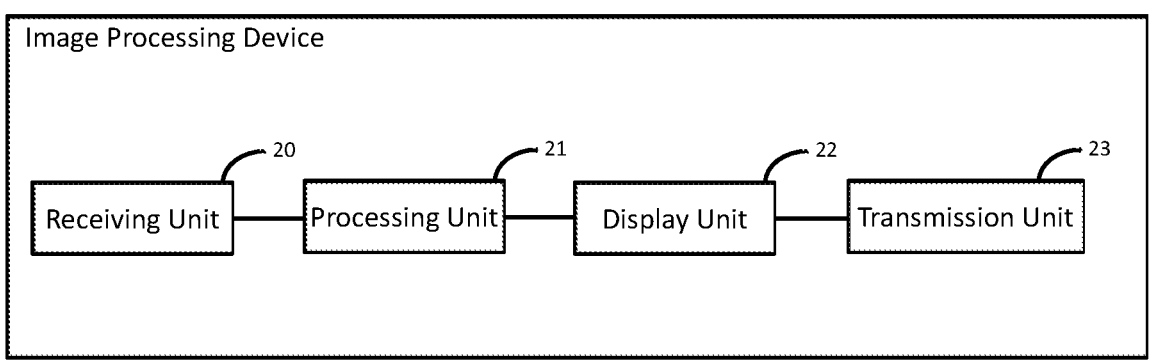
FIG. 11 is a schematic structural diagram of an image processing device according to Embodiment 16 of the present invention.

Based on the above embodiment, referring to FIG. 11. In Embodiment 16 of the present invention, image processing device specifically includes:

a receiving unit 20, configured to acquire the image data of a user acquired by an endoscope, wherein the image data includes at least image data captured by an imaging unit in the endoscope, and the type of the image data is a depth image. The acquired image data of the user indicates that splicing processing has not been performed.

a processing unit 21, configured to splice the image data and/or the image data and the stored image data block to obtain a spliced image data block, wherein the image data block includes at least one image data, and respectively matches the image data blocks containing the image data in the spliced image data block with the images of blocks in the stored three-dimensional image frame database; wherein the three-dimensional image frame database stores data of images of blocks that divide the three-dimensional image frame image and location information of images of each block, the image data of the block includes number information and image feature information;

a display unit 22, configured to display all or part of the spliced image data block according to a second preset display strategy if the processing unit determines that the mapping relationship between the image data block containing the image data and the block in the three-dimensional image frame database is not obtained, and the spliced image data block does not obtain the image data block with the mapping relationship with the block in the three-dimensional image frame database;

a transmission unit 23, configured to upload part or all of the spliced image data block to the cloud serer according to the preset rules if it is determined that the preset conditions are satisfied, so that the cloud server updates the stored three-dimensional image frame database according to part or all of the spliced image data block.

Preferably, according to a second preset display strategy, all or part of the spliced image data block is displayed, and the display unit 22 is specifically configured to:

sort the spliced image data block from large to small according to the area of the image data blocks or the number of the image data blocks containing the image data if the number of the spliced image data block is a;

determine the number d of display areas in the current display interface and judge the values of a and d, if a is not less than d, the first d image data blocks are extracted from the sorted a image data blocks, and the extracted first d image data blocks are sequentially displayed in the d display areas, respectively, if a is less than d, the number of display areas in the current display interface is adjusted so that the number of display areas is the same as a, and the a image data blocks are sequentially displayed in the display areas in the adjusted current display interface, respectively;

the receiving unit 20 is further configured to return to perform acquisition of the image data of the user acquired by the endoscope after the display unit 22 displays all or part of the spliced image data block according to a second preset display strategy.

Preferably, the processing unit 21 is further configured to:

determine that the number of the image data is larger than a preset threshold value.

It should be noted that in the embodiment of the present invention, the above-mentioned image processing devices in Embodiments 15 and 16, wherein the receiving unit, the processing unit, the display unit and the transmission unit can all be integrated in one user terminal, for example. In a mobile phone, of course, they can also be separated. For example, for an endoscope with a handle, a receiving unit, a processing unit and a transmission unit can be integrated into the handle of the endoscope, and a display unit can be integrated into a mobile phone. Alternatively, it is possible to integrate part of the functions of the receiving unit and the processing unit into the handle of the endoscope, and other functions of the processing unit, the display unit and the transmission unit are integrated into the mobile phone in actual implementation, which is not limited in the embodiments of the present invention. In addition, the endoscope transmits image data to the mobile phone, performs splicing and processing of three-dimensional curved surface images on the mobile phone, and then displays the processed three-dimensional true color images on the mobile phone, all of which are performed locally without connecting to the cloud through the Internet, and can also be realized by a built-in engine of the handset chip in actual implementation, of course, the chip with the built-in ANN engine can also be arranged in the handle of the endoscope.

Embodiment 17

Based on the above embodiment, the image processing method in the embodiment of the present invention may include the following operations in actual engineering implementation:

Step 1) obtaining image data acquired by an endoscope and obtain a spliced image data block;

Step 2): constructing a human oral cavity endoscopic panoramic label system, namely a three-dimensional image frame database, based on the existing oral cavity image database and the image data block in step 1), wherein the label system of the three-dimensional image frame database at least includes block number information, relative location information, image information and the like;

Step 3): training the ANN by training methods such as in-depth learning and/or reinforcement learning to obtain the latest version of the executive ANN based on the label system of step 2), wherein the ANN represents a multi-layer neural network with a specific architecture and weights;

Step 4): putting the latest version of the executive ANN into the chip to undertake image matching processing functions, such as CAMBRIAN or AI chips such as Kirin 970NPU;

(5) performing splicing, matching, reconstructing and other processing on the image data acquired after the endoscope is placed in the oral cavity, thereby realizing self-service three-dimensional true color display of the multi-initial point endoscopic image of the user, namely obtaining the three-dimensional image of the oral cavity of the user, and further carrying out artificial intelligence inspection on the current oral health condition of the user based on the three-dimensional image of the oral cavity of the user;

Step 6): for the image data beyond the existing label system, firstly, splicing the image data to obtain a spliced image data block to meet the user's endoscopic requirements; secondly, uploading the image data to a cloud server and distributing it to dental experts to update the label system of the three-dimensional image frame database. Subsequently, the whole system obtained the latest version of the oral endoscopic panoramic label system, namely the updated three-dimensional image frame database. After that, re-execute step 2).

Those skilled in the art will appreciate that embodiments of the present invention may be provided as methods, systems, or computer program products. Thus, the present invention may take the form of an entirely hardware embodiment, an entirely software embodiment, or an embodiment combining software and hardware aspects. Furthermore, the present invention may take the form of a computer program product implemented on one or more computer usable storage media (including but not limited to magnetic disk memory, CD-ROA, optical memory, etc.) having computer usable program code embodied therein.

The present invention is described with reference to flowcharts and/or block diagrams of methods, device (systems), and computer program products according to embodiments of the present invention. It should be understood that each flow and/or block in the flowchart and/or block diagram, and combinations of flows and/or blocks in the flowchart and/or block diagram, may be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device produce means for implementing the functions specified in the flowchart flow or flows and/or block or blocks of the block diagram.

These computer program instructions may also be stored in a computer-readable memory that can direct a computer or other programmable data processing device to function in a particular manner, such that the instructions stored in the computer-readable memory produce an article of manufacture including instruction means that implement the functions specified in the flowchart flow or flows and/or block or blocks of the block diagram.

These computer program instructions may also be loaded onto a computer or other programmable data processing device such that a series of operational steps are performed on the computer or other programmable device to produce a computer implemented process, such that the instructions that execute on the computer or other programmable device provide steps for implementing the functions specified in the flowchart flow or flows and/or block or blocks of the block diagram.

Although the preferred embodiments of the present invention have been described, those skilled in the art can make additional changes and modifications to these embodiments once they know the basic inventive concepts. Therefore, the appended claims are intended to be interpreted as including the preferred embodiment and all changes and modifications that fall within the scope of the present invention.

Obviously, those skilled in the art can make various changes and modifications to the embodiments of the present invention without departing from the spirit and scope of the embodiments of the present invention. Thus, if these modifications and variations of the embodiments of the present invention fall within the scope of the claims of the present invention and their equivalents, the present invention is also intended to include these modifications and variations.

What is claimed is:

1. An image processing method, comprising the following steps of:

Step A, obtaining an image of a user acquired by an endoscope, wherein the image data at least comprises image data captured by an imaging unit in the endoscope;

Step B, splicing the image data, and/or the image data and stored image data blocks to obtain a spliced image data block, wherein the image data block includes at least one image data;

Step C, respectively matching the image data blocks containing the image data in the spliced image data block with the images of the blocks in the stored three-dimensional image frame database, wherein the three-dimensional image frame database stores image data of blocks dividing the three-dimensional image frame image of and location information of images of each block;

Step D, determining the location of the block corresponding to the at least one image data block containing the image data in the stored three-dimensional image contour of the user according to the mapping relationship, if it is determined to obtain a mapping relationship between at least one image data block containing the image data and a block in the three-dimensional image frame database, and reconstructing the at least one image data block containing the image data on the corresponding determined location in the three-dimensional image contour of the user to obtain reconstructed three-dimensional image data, updating the currently restored three-dimensional image model of the user according to the reconstructed three-dimensional image data, and displaying all or part of the updated three-dimensional image model of the user and the spliced image data block other than the other image data blocks determined to obtain the mapping relationship according to a first preset display policy, wherein the initial value of the three-dimensional image model of the user is the three-dimensional image contour of the user.

2. The method according to claim 1, wherein the location information of the image of the block comprises: a spatial location relationship between each block;
the image of each block in the three-dimensional image contour is a three-dimensional curved surface shape based on the image of the block in the three-dimensional image frame database or the three-dimensional image model of the user, and comprises a preset image with a single color and a single texture.

3. The method according to claim 1, wherein the step of displaying all or part of the updated three-dimensional image model of the user and the spliced image data block other than the other image data blocks determined to obtain the mapping relationship according to a first preset display policy specifically comprises:
sorting the spliced image data block except other image data blocks which have determined to obtain mapping relation from large to small according to the area of the image data blocks or the number of image data included in the image data blocks;
determining the number d of display areas in the current display interface and the number n of other image data blocks in the spliced image data block except those which have determined to obtain a mapping relationship, and judging the values of n and d−1;
extracting the first d−1 image data blocks from the soiled image data blocks, if n is not less than d−1, and sequentially displaying the updated three-dimensional image model of the user and the extracted first image data blocks in the d display areas, respectively;
adjusting the number of display areas in the current display interface so that the number of display areas is the same as n+1, if n is less than d−1, and sequentially displaying the updated three-dimensional image model of the user and the sorted image data blocks in the display areas in the adjusted current display interface, respectively.

4. The method according to claim 1 further comprising: recording the number information of the block determined to obtain the mapping relationship according to the mapping relationship if it is determined to obtain a mapping relationship between at least one image data block containing the image data and a block in the three-dimensional image frame database.

5. The method according to claim 1, wherein if it is determined that the mapping relationship between the image data block containing the image data and the block in the three-dimensional image frame database is not obtained, and at least one of the spliced image data block has obtained the mapping relationship with the block in the three-dimensional image frame database, Step D further comprises:
displaying all or part of the currently stored three-dimensional image model of the user and other image data blocks in the spliced image data block except those which have determined to obtain a mapping relationship according to a first preset display strategy.

6. The method according to claim 5, wherein the step of displaying all or part of the currently stored three-dimensional image model of the user and other image data blocks in the spliced image data block except those which have determined to obtain a mapping relationship according to a first preset display strategy specifically comprises:
sorting the spliced image data block except other image data blocks which have determined to obtain mapping relation from large to small according to the area of the image data blocks or the number of image data included in the image data blocks;
determining the number d of display areas in the current display interface and the number n of other image data blocks in the spliced image data block except those which have determined to obtain a mapping relationship, and judging the values of n and d−1;
extracting the first d−1 image data blocks from the sorted image data blocks, if n is not less than d−1, and sequentially displaying the currently stored three-dimensional image model of the user and the extracted first d−1 image data blocks in the d display areas, respectively;
adjusting the number of display areas in the current display interface so that the number of display areas is the same as n+1, if n is less than d−1, and sequentially displaying the currently stored three-dimensional image model of the user and the sorted image data blocks in the display areas in the adjusted current display interface, respectively.

7. The method according to claim 1, wherein if it is determined that the mapping relationship between the image data block containing the image data and the block in the three-dimensional image frame database is not obtained, and the image data block with the mapping relationship with the block in the three-dimensional image frame database is not obtained in the spliced image data block, Step D further comprises:
displaying all or part of the spliced image data block according to a second preset display strategy.

8. The method according to claim 7, wherein the step of displaying all or part of the spliced image data block according to a second preset display strategy specifically comprises:
sorting the spliced image data block from large to small according to the area of the image data blocks or the number of the image data blocks containing the image data if the number of the spliced image data block is a;
determining the number d of display areas in the current display interface and judging the values of a and d, extracting the first d image data blocks from the sorted a image data blocks, if a is not less than d, and sequentially displaying the extracted first d image data blocks in the d display areas, respectively, adjusting the number of display areas in the current display interface so that the number of display areas is the same as a, if a is less than d, and sequentially displaying the a image data blocks in the display areas in the adjusted current display interface, respectively.

9. The method according to claim 1 further comprising:
uploading the updated three-dimensional image model of the user and the recorded number information of the blocks determined to obtain the mapping relationship to a cloud server, and uploading part or all of the spliced image data block except the image data blocks which have determined to obtain the mapping relation with the blocks in the three-dimensional image frame database are uploaded to the cloud server according to a preset rule, if it is determined that the preset condition is satisfied, so that the cloud server updates the stored three-dimensional image frame database according to the updated three-dimensional image model of the user and the number information of the blocks which have determined to obtain the mapping relation and part or all of the spliced image data block except the image data blocks which have determined to obtain the mapping relation with the blocks in the three-dimensional image frame database.

10. An image processing method, comprising the following steps of:
Step A, obtaining image data of a user acquired by an endoscope, wherein the image data at least comprises image data captured by an imaging unit in the endoscope;
Step B, splicing the image data, and/or the image data and stored image data blocks to obtain a spliced image data block, wherein the image data block includes at least one image data;
Step C, respectively matching the image data blocks containing the image data in the spliced image data block with the images of the blocks in the stored three-dimensional image frame database, wherein the three-dimensional image frame database stores image data of blocks dividing the three-dimensional image frame image of and location information of images of each block;
Step D, if it is determined that the mapping relationship between the image data block containing the image data and the blocks in the three-dimensional image frame database is not obtained, and the image data block with the mapping relationship with the blocks in the three-dimensional image frame database is not obtained in the spliced image data block, displaying all or part of the spliced image data block according to a second preset display strategy.

11. The method according to claim 10, wherein the step of displaying all or part of the spliced image data block according to a second preset display strategy comprises:
sorting the spliced image data block from large to small according to the area of the image data blocks or the number of the image data blocks containing the image data if the number of the spliced image data block is a;
determining the number d of display areas in the current display interface and judging the values of a and d, extracting the first d image data blocks from the sorted an image data blocks, if a is not less than d, and sequentially displaying the extracted first d image data blocks in the d display areas, respectively, adjusting the number of display areas in the current display interface so that the number of display areas is the same as a, if a is less than d, and sequentially displaying the a image data blocks in the display areas in the adjusted current display interface, respectively;
the method further comprises: after performing Step D, returning to perform Step A.

12. An image processing device, comprising:
a receiving unit, configured to obtain image data of a user acquired by the endoscope, wherein the image data at least comprises an image captured by an imaging unit in the endoscope;
a processing unit, configured to: splice the image data and/or the image data and the stored image data block to obtain a spliced image data block, wherein the image data block includes at least one image data; match the image data blocks containing the image data in the spliced image data block with the images of the blocks in the stored three-dimensional image frame database, respectively, and determine the location of the block corresponding to the at least one image data block containing the image data in the stored three-dimensional image contour of the user according to the mapping relationship, if it is determined to obtain a mapping relationship between at least one image data block containing the image data and a block in the three-dimensional image frame database, and reconstructing the at least one image data block containing the image data on the corresponding determined location in the three-dimensional image contour of the user to obtain reconstructed three-dimensional image data, and update the currently stored three-dimensional image model of the user according to the reconstructed three-dimensional image data, wherein the three-dimensional image frame database stores image data of blocks dividing the three-dimensional image frame image of and location information of images of each block; the initial value of the three-dimensional image model of the user is the three-dimensional image contour of the user;
a display unit, configured to display all or part of the updated three-dimensional image model of the user and other image data blocks in the spliced image data block except those that have determined to obtain a mapping relationship according to a first preset display strategy.

13. The device according to claim 12, wherein the location information of the image of the block comprises a spatial location relationship between each block;
the image of each block in the three-dimensional image contour is a three-dimensional curved surface shape based on the image of the block in the three-dimensional image frame database or the three-dimensional image model of the user, and comprises a preset image with a single color and a single texture.

14. The device according to claim 12, wherein for the step to display all or part of the updated three-dimensional image model of the user and the spliced image data block other than the other image data blocks determined to obtain the mapping relationship according to a first preset display policy, the display unit is specifically configured to:
sort the spliced image data block except other image data blocks which have determined to obtain mapping relation from large to small according to the area of the image data blocks or the number of image data included in the image data blocks;
determine the number d of display areas in the current display interface and the number n of other image data blocks in the spliced image data block except those which have determined to obtain a mapping relationship, and judge the values of n and d−1;
extract the first d−1 image data blocks from the sorted image data blocks, if n is not less than d−1, and sequentially display the updated three-dimensional image model of the user and the extracted first d−1 image data blocks in the d display areas, respectively;
adjust the number of display areas in the current display interface so that the number of display areas is the same as n+1, if n is less than d−1, and sequentially display the updated three-dimensional image model of the user and the sorted image data blocks in the display areas in the adjusted current display interface, respectively.

15. The device according to claim 12, wherein the processing unit is further configured to:
record the number information of the block determined to obtain the mapping relationship according to the mapping relationship if it is determined to obtain a mapping relationship between at least one image data block containing the image data and a block in the three-dimensional image frame database.

16. The device according to claim 12, wherein the processing unit is further configured to, if it is determined that the mapping relationship between the image data block containing the image data and the block in the three-dimensional image frame database is not obtained, and at least one of the spliced image data block has obtained the mapping relationship with the block in the three-dimensional image frame database, the display unit is further configured to:
    display all or part of the currently stored three-dimensional image model of the user and other image data blocks in the spliced image data block except those which have determined to obtain a mapping relationship according to a first preset display strategy.

17. The device according to claim 16, wherein the step to display all or part of the currently stored three-dimensional image model of the user and other image data blocks in the spliced image data block except those which have determined to obtain a mapping relationship according to a first preset display strategy, the display unit is specifically configured to:
    sort the spliced image data block except other image data blocks which have determined to obtain mapping relation from large to small according to the area of the image data blocks or the number of image data included in the image data blocks;
    determine the number d of display areas in the current display interface and the number n of other image data blocks in the spliced image data block except those which have determined to obtain a mapping relationship, and judge the values of n and d−1;
    extract the first d−1 image data blocks from the sorted image data blocks, if n is not less than d−1, and sequentially display the currently stored three-dimensional image model of the user and the extracted first d−1 image data blocks in the d display areas, respectively;
    adjust the number of display areas in the current display interface so that the number of display areas is the same as n+1, if n is less than d−1, and sequentially display the currently stored three-dimensional image model of the user and the sorted image data blocks in the display areas in the adjusted current display interface, respectively.

18. The device according to claim 12, wherein the processing unit is further configured to, if it is determined that the mapping relationship between the image data block containing the image data and the block in the three-dimensional image frame database is not obtained, and the image data block with the mapping relationship with the block in the three-dimensional image frame database is not obtained in the spliced image data block, the display unit is further configured to:
    display all or part of the spliced image data block according to a second preset display strategy.

19. The device according to claim 18, wherein the step of displaying all or part of the spliced image data block according to a second preset display strategy, the display unit is specifically configured to:
    sort the spliced image data block from large to small according to the area of the image data blocks or the number of the image data blocks containing the image data if the number of the spliced image data block is a;
    determine the number d of display areas in the current display interface and judge the values of a and d, if a is not less than d, take out the first d image data blocks from the sorted a image data blocks, and sequentially display the taken out first d image data blocks in the d display areas, respectively; if a is less than d, adjust the number of display areas in the current display interface so that the number of display areas is the same as a, and sequentially display the a image data blocks in the display areas in the adjusted current display interface, respectively.

20. The device according to claim 12, further comprising:
    a transmission unit, configured to update the updated three-dimensional image model of the user and the recorded number information of the blocks determined to obtain the mapping relationship to a cloud server, and upload part or all of the spliced image data block except the image data blocks which have determined to obtain the mapping relation with the blocks in the three-dimensional image frame database are uploaded to the cloud server according to a preset rule, if it is determined that the preset condition is satisfied, so that the cloud server updates the stored three-dimensional image frame database according to the updated three-dimensional image model of the user and the number information of the blocks which have determined to obtain the mapping relation and part or all of the spliced image data block except the image data blocks which have determined to obtain the mapping relation with the blocks in the three-dimensional image frame database.

* * * * *